(12) United States Patent
Xiao et al.

(10) Patent No.: US 8,931,049 B2
(45) Date of Patent: Jan. 6, 2015

(54) TRUSTED NETWORK CONNECTION IMPLEMENTING METHOD BASED ON TRI-ELEMENT PEER AUTHENTICATION

(75) Inventors: Yuelei Xiao, Shaanxi (CN); Jun Cao, Shaanxi (CN); Li Ge, Shaanxi (CN); Zhenhai Huang, Shaanxi (CN)

(73) Assignee: China Iwncomm Co., Ltd., Shaanxi (CN)

( * ) Notice: Subject to any disclaimer, the term of this patent is extended or adjusted under 35 U.S.C. 154(b) by 837 days.

(21) Appl. No.: 13/133,333

(22) PCT Filed: Dec. 1, 2009

(86) PCT No.: PCT/CN2009/075242
§ 371 (c)(1),
(2), (4) Date: Jun. 7, 2011

(87) PCT Pub. No.: WO2010/066169
PCT Pub. Date: Jun. 17, 2010

(65) Prior Publication Data
US 2011/0239271 A1   Sep. 29, 2011

(30) Foreign Application Priority Data
Dec. 8, 2008  (CN) .......................... 2008 1 0184119

(51) Int. Cl.
*G06F 7/04*   (2006.01)
*H04L 29/06*  (2006.01)
*G06F 21/31*  (2013.01)
*G06F 21/62*  (2013.01)

(52) U.S. Cl.
CPC ............ *H04L 63/0869* (2013.01); *G06F 21/31* (2013.01); *G06F 21/6209* (2013.01); *H04L 63/0876* (2013.01); *G06F 2221/2141* (2013.01); *H04L 63/10* (2013.01)

USPC ............................................... 726/2; 713/169

(58) Field of Classification Search
CPC ... H04L 63/00; H04L 63/0281; H04L 63/029; H04L 63/061; H04L 63/08; H04L 63/0823; H04L 63/0869; H04L 63/0876; H04L 63/10; H04L 63/12; H04L 63/123; H04L 63/126; H04L 63/20; H04L 9/30; H04L 9/32; H04L 9/321; H04L 9/3247; H04L 9/3263; H04L 9/3271; H04L 9/3273; H04L 29/06816; H04W 12/08; H04W 12/10; G06F 21/33; G06F 21/44; G06F 21/445; G06F 21/568; G06F 21/57; G06F 2221/2129
USPC ........ 726/1–3, 5–7, 11–12, 14; 713/155–156, 713/169, 171, 175, 182–183, 185–186; 380/283, 285
See application file for complete search history.

(56) References Cited

U.S. PATENT DOCUMENTS

| | | | |
|---|---|---|---|
| 7,592,906 B1 * | 9/2009 | Hanna et al. .................. 340/506 |
| 8,010,679 B2 * | 8/2011 | Low et al. ..................... 709/227 |
| 8,533,846 B2 * | 9/2013 | Rivera ............................. 726/26 |
| 2003/0196119 A1 * | 10/2003 | Raley et al. .................... 713/201 |
| 2004/0268145 A1 * | 12/2004 | Watkins et al. ............... 713/201 |
| 2005/0289347 A1 * | 12/2005 | Ovadia ........................... 713/171 |
| 2006/0200856 A1 * | 9/2006 | Salowey et al. .................... 726/5 |
| 2007/0006282 A1 * | 1/2007 | Durham et al. .................... 726/2 |
| 2007/0006309 A1 * | 1/2007 | Herbert et al. ................... 726/24 |
| 2007/0050842 A1 * | 3/2007 | Smith et al. ...................... 726/12 |
| 2007/0143629 A1 * | 6/2007 | Hardjono et al. ............. 713/189 |
| 2008/0295144 A1 * | 11/2008 | Cam-Winget et al. ............ 726/1 |
| 2008/0301754 A1 * | 12/2008 | Furuichi et al. ................... 726/1 |
| 2009/0047931 A1 * | 2/2009 | Nanda et al. ................... 455/411 |
| 2009/0158407 A1 * | 6/2009 | Nicodemus et al. .............. 726/6 |
| 2009/0228951 A1 * | 9/2009 | Ramesh et al. .................... 726/1 |

FOREIGN PATENT DOCUMENTS

| | | |
|---|---|---|
| CN | 101136928 | 3/2008 |
| CN | 101159640 | 4/2008 |
| CN | 101232378 | 7/2008 |
| CN | 101242266 | 8/2008 |
| CN | 101242267 | 8/2008 |
| CN | 101447992 | 6/2009 |
| EP | 1852999 A1 * | 11/2007 |

OTHER PUBLICATIONS

Shen et al., "CN 101136928 A—Reliable network access framework (Machine translation)" [Online], Mar. 5, 2008 [Retrieved: Apr. 14, 2014], University Beijing Technology, [Retrieved from: http://worldwide.espacenet.com/publicationDetails/description?CC=CN&NR=101136928A&KC=A&FT=D&ND=3&date=20080305&DB=worldwide.espacenet.com&locale=en_EP ].*

"TCG Trusted Network Connect TNC Architecture for Interoperability—Specification Version 1.3 Revision 6" [Online], Apr. 28, 2008 [Retrieved on Apr. 17, 2014], www.trustedcomputinggroup.org, [Retrieved from: http://www.opus1.com/nac/tnc/tnc_architecture_v1_3_r6.pdf ].*

International Search Report issued in PCT/CN2009/075242, mailed Mar. 11, 2010.

Chinese Office Action issued in Chinese counterpart application 200810184119.3, dated Apr. 27, 2010.

* cited by examiner

*Primary Examiner* — Saleh Najjar
*Assistant Examiner* — Eric W Shepperd

(74) *Attorney, Agent, or Firm* — Greer Burns & Crain Ltd.

(57) ABSTRACT

A trusted network connection implementing method based on Tri-element Peer Authentication is provided in present invention, the method includes: step 1, configuring and initializing; step 2, requesting for network connection, wherein an access requester sends a network connection request to and access controller, and the access controller receives the network connection request; step 3, authenticating user ID; and step 4, authenticating a platform. The invention enhances the safety of the trusted network connection implementing method, widens the application range of the trusted network connection implementing method based on the Tri-element Peer Authentication, satisfies requirements of different network apparatuses and improves the efficiency of the trusted network connection implementing method based on the Tri-element Peer Authentication.

8 Claims, 3 Drawing Sheets

US 8,931,049 B2

TRUSTED NETWORK CONNECTION IMPLEMENTING METHOD BASED ON TRI-ELEMENT PEER AUTHENTICATION

The present application is a US National Stage of International Application No. PCT/CN2009/075242, filed 1 Dec. 2009, designating the United States, and claiming priority to Chinese Patent Application No. 200810184119.3, filed with the Chinese Patent Office on Dec. 8, 2008 and entitled "Trusted network connection method based upon tri-element peer authentication", both of which are hereby incorporated by reference in their entirety.

FIELD OF THE INVENTION

The present invention relates to the field of communications and in particular to a trusted network connection method based upon tri-element peer authentication.

BACKGROUND OF THE INVENTION

The issue of malicious software, e.g., viruses, worms, etc., has become prominent along with the informatization development. There have been more than thirty-five thousand kinds of malicious software at present, and more than forty million computers have been infected annually. It is required for inhibition of such attacks to not only provide secured transmission and a check for data input but also provide defense at an origin, that is, each terminal connected to a network. However, traditional security defense has failed to defend numerous malicious attacks.

The international Trusted Computing Group (TCG) has established specifically for this issue a trusted computing based network connection specification—Trusted Network Connect (TNC), simply TCG-TNC, which includes an open terminal integrity architecture and a set of standards for guaranteeing secure interoperations. This set of standards can protect a network as demanded for a user to a user-customized protection extent. The TCG-TNC is essentially intended to establish a connection starting with integrity of a terminal. It is initially required to create a set of strategies for the operation condition of a system internal to the trusted network. Only a terminal complying with a strategy which is set for the network can access the network, and the network may isolate and locate those devices that do not comply with the strategy. An attack of root kits can also be blocked due to the use of a trusted platform module. The root kits refers to a kind of attack script, modified system program or set of attack scripts and kits, which is intended in a target system to acquire illegally a top control privilege of the system.

Since an access requester does not evaluate integrity of a policy enforcement point in the TCG-TNC architecture so that the issue of the policy enforcement point being not trusted arises in the TCG-TNC architecture, a trusted network connect architecture based upon Tri-element Peer Authentication (TePA) is proposed in the prior art to address the issue, and FIG. 1 is a schematic diagram of a trusted network connect architecture based upon tri-element peer authentication in the prior art.

However, since the trusted network connect architecture based upon tri-element peer authentication is totally different from the TCG-TNC architecture, the trusted network connection method in the TCG-TNC architecture can not be applicable to the trusted network connect architecture based upon tri-element peer authentication.

SUMMARY OF THE INVENTION

The invention provides a trusted network connection method based upon tri-element peer authentication to perform a trusted network connection method applicable to a trusted network connect architecture based upon tri-element peer authentication.

The invention provides a trusted network connection method based upon tri-element peer authentication including:

an operation 1 of performing configuration and initialization;

an operation 2 of requesting a network connection: an access requester transmitting a network connection request to an access controller, and the access controller receiving the network connection request;

an operation 3 of performing user identity authentication; and an operation 4 of performing platform authentication;

where the operation 1 includes:

an operation 11 of a network user configuring the access requester with a security policy for the access controller, including a platform evaluation policy of the access requester for the access controller; and a network administrator configuring the access controller with a security policy for the access requester, including a platform evaluation policy of the access controller for the access requester; and an operation 12 of the access requester and the access controller loading and initializing respective integrity measurement collectors, and a policy manager loading and initializing an integrity measurement verifier;

the operation 3 includes:

an operation 31 of branching to an operation 33 if the access requester or the access controller does not require user identity authentication;

an operation 32 of, if the access requester or the access controller requires user identity authentication, then when the access requester and the access controller have not performed user identity authentication, the access requester and the access controller executing a tri-element peer authentication protocol with the policy manager being a trusted party to perform user identity authentication and key negotiation between the access requester and the access controller and performing the operation 33; or when the access requester and the access controller have performed user identity authentication, the access requester and the access controller performing user identity authentication and key negotiation between the access requester and the access controller based upon performed user identity authentication or executing the tri-element peer authentication protocol again based upon the policy manager being a trusted party to perform user identity authentication and key negotiation between the access requester and the access controller and performing the operation 33; and the operation 33 of, if the access requester or the access controller requires prompt making of an access decision, then when the access requester or the access controller does not require user identity authentication, each of the access requester and the access controller making an access decision according to a local security policy to perform access control; or when the access requester or the access controller requires user identity authentication, each of the access requester and the access controller making an access decision according to a user identity authentication result of the opposite party and the local security policy to perform access control; otherwise, the access requester or the access controller requesting platform authentication.

The operation 4 includes:

an operation 41 of the access requester or the access controller requesting online a platform identity certificate from the policy manager if the access requester or the access controller requires online requesting the platform identity certificate from the policy manager;

an operation 42 of, if the network administrator has not configured the access controller with a platform evaluation policy for the access requester, then the access controller requesting a platform evaluation policy for the access requester from the policy manager, and then the policy manager transmitting the platform evaluation policy of the access controller for the access requester to the access controller, and the access controller performing configuration upon reception of the platform evaluation policy of the access controller for the access requester;

an operation 43 of the access requester and the access controller executing the tri-element peer authentication protocol with the policy manager being a trusted party to perform platform authentication, including platform identity verification and platform integrity evaluation, between the access requester and the access controller, where the policy manager is responsible for platform identity certificate verification and integrity measurement verifier-level evaluation of platform integrity for the access requester and the access controller;

an operation 44 of performing the operation 43 for a plurality of rounds until each of the access requester and the access controller has performed platform integrity evaluation on the opposite party according to the configured platform evaluation policy, and the access requester generating a platform-level evaluation result of platform integrity of the access controller from the platform evaluation policy for the access controller and an integrity measurement verifier-level evaluation result of platform integrity of the access controller, then the access requester generating a platform authentication result on the access controller from the platform evaluation policy for the access controller, a verification result of the platform identity certificate of the access controller and the platform-level evaluation result of platform integrity of the access controller; and the access controller generating a platform-level evaluation result of platform integrity of the access requester from the platform evaluation policy for the access requester and an integrity measurement verifier-level evaluation result of platform integrity of the access requester, then the access controller generating a platform authentication result on the access requester from the platform evaluation policy for the access requester, a verification result of the platform identity certificate of the access requester and the platform-level evaluation result of platform integrity of the access requester; and the operation 45 of, when the access requester or the access controller does not require user identity authentication, each of the access requester and the access controller making an access decision according to the local security policy and the platform authentication result on the opposite party to perform access control; or when the access requester or the access controller requires user identity authentication, each of the access requester and the access controller making an access decision according to a user identity authentication result of the opposite party, the platform authentication result on the opposite party and the local security policy to perform access control.

The operation 4 includes:

an operation 401 of the access requester or the access controller requesting online a platform identity certificate from the policy manager if the access requester or the access controller requires online requesting the platform identity certificate from the policy manager;

an operation 402 of, if the network administrator has not configured the access controller with a platform evaluation policy for the access requester, then the access controller requesting a platform evaluation policy for the access requester from the policy manager, and then the policy manager transmitting the platform evaluation policy of the access controller for the access requester to the access controller, and the access controller performing configuration upon reception of the platform evaluation policy of the access controller for the access requester;

an operation 403 of the access requester and the access controller executing the tri-element peer authentication protocol with the policy manager being a trusted party to perform platform authentication, including platform identity verification and platform integrity evaluation, between the access requester and the access controller, where the policy manager is responsible for platform identity certificate verification and platform-level evaluation of platform integrity for the access requester and the access controller;

an operation 404 of performing the operation 403 for a plurality of rounds until each of the access requester and the access controller has performed platform integrity evaluation on the opposite party according to the configured platform evaluation policy, and the policy manager generating and transmitting, to the access requester and the access controller, platform-level evaluation results of platform integrity of the access requester and the access controller; and the access requester generating a platform authentication result on the access controller from the platform evaluation policy for the access controller, a verification result of the platform identity certificate of the access controller and the platform-level evaluation result of platform integrity of the access controller; and the access controller generating a platform authentication result on the access requester from the platform evaluation policy for the access requester, a verification result of the platform identity certificate of the access requester and the platform-level evaluation result of platform integrity of the access requester; and an operation 405 of, when the access requester or the access controller does not require user identity authentication, each of the access requester and the access controller making an access decision according to the local security policy and the platform authentication result on the opposite party to perform access control; or when the access requester or the access controller requires user identity authentication, each of the access requester and the access controller making an access decision according to a user identity authentication result of the opposite party, the platform authentication result on the opposite party and the local security policy to perform access control.

After the operation 4, the method further includes an operation 5 of performing another platform authentication after platform repair.

The operation 5 includes:

an operation 51 of the access requester or the access controller performing platform repair if the access requester or the access controller requires platform repair after the operation 4 is performed; and an operation 52 of branching to the operation 2, the operation 3 or the operation 4 dependent upon the local security policy and an influence of platform repair on network connectivity between the access requester and the access controller after the access requester or the access controller performs platform repair.

After the operation 5, the method further includes an operation 6 of performing another platform authentication activated after platform authentication; and branching to the operation 3 or the operation 4 according to the local security policy if the access requester or the access controller is activated according to the local policy security to perform another platform authentication.

The invention is also applicable to trusted communication between entities.

Particularly, when an access requester is connected to a network through an access controller, if the access requester requires trusted communication with another access requester in the network, then the access requester, the other access requester and a policy manager perform the trusted network connection method based upon tri-element peer authentication according to the invention to perform user identity authentication and platform authentication between the access requester and the other access requester, thus ensuring trusted communication between the access requester and the other access requester, where either the access requester or the other access requester may play the role of the access requester or the access controller in the trusted network connection method based upon tri-element peer authentication according to the invention.

The invention is also applicable to trusted management on an entity.

Particularly, when a policy manager requires trusted management on an access controller and respective access requesters in a network, if the policy manager requires trusted management on an access requester in the network, then the access requester and the policy manager perform the trusted network connection method based upon tri-element peer authentication according to the invention to perform user identity authentication and platform authentication on the access requester by the policy manager, where the access requester plays the role of the access requester in the trusted network connection method based upon tri-element peer authentication according to the invention, and the policy manager plays the roles of the access controller and the policy manager in the trusted network connection method based upon tri-element peer authentication according to the invention; or if the policy manager requires trusted management on the access controller in the network, then the access controller and the policy manager perform the trusted network connection method based upon tri-element peer authentication according to the invention to perform user identity authentication and platform authentication on the access controller by the policy manager, where the access controller plays the role of the access requester in the trusted network connection method based upon tri-element peer authentication according to the invention, and the policy manager plays the roles of the access controller and the policy manager in the trusted network connection method based upon tri-element peer authentication according to the invention.

The invention has the following advantages.

1. The invention performs the tri-element peer authentication protocol on the access requester, the access controller and the policy manager to enhance the security of the trusted network connection method.

2. The invention extends a bi-element trusted network connect architecture of TCG-TNC to be applicable to a trusted network architecture based upon tri-element peer authentication to improve an application scope of the trusted network connection method based upon tri-element peer authentication.

3. Platform authentication according to the invention can be performed in one or more rounds of the protocol to satisfy demands of various network devices and also improve the efficiency of the trusted network connection method based upon tri-element peer authentication.

4. The invention can be applicable to a trusted network connection of an entity, to trusted communication between peer entities and to trusted management on an entity to improve the applicability of the trusted network connection method based upon tri-element peer authentication.

DETAILED DESCRIPTION OF THE EMBODIMENTS

Figure 1:
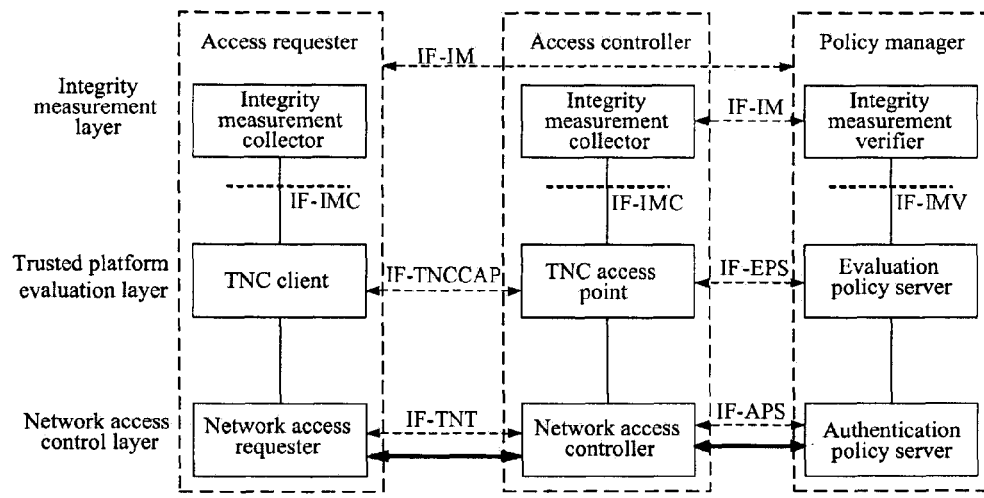
FIG. 1 is a schematic diagram of a trusted network connect architecture based upon tri-element peer authentication in the prior art.
Figure 2:
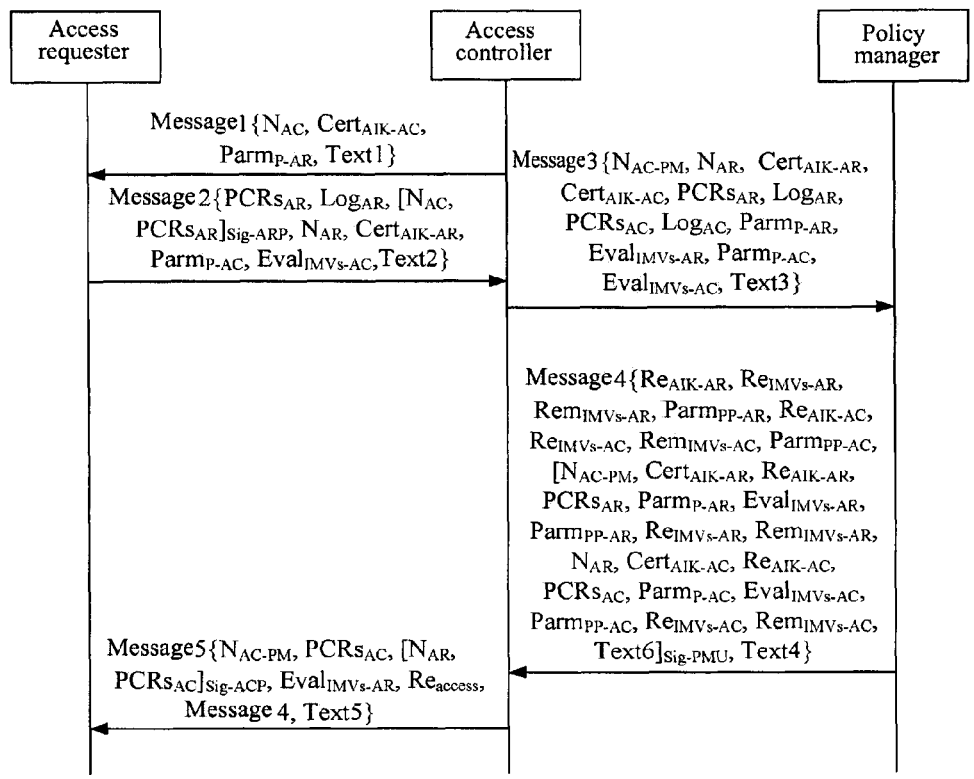
FIG. 2 is a flow chat of a first embodiment in a first mode according to the invention.

There are two modes for the method according to the invention. FIG. 2 is a flow chart of a first embodiment in a first mode according to the invention, and FIG. 3 is a flow chart of a second embodiment in the first mode according to the invention.

Figure 3:
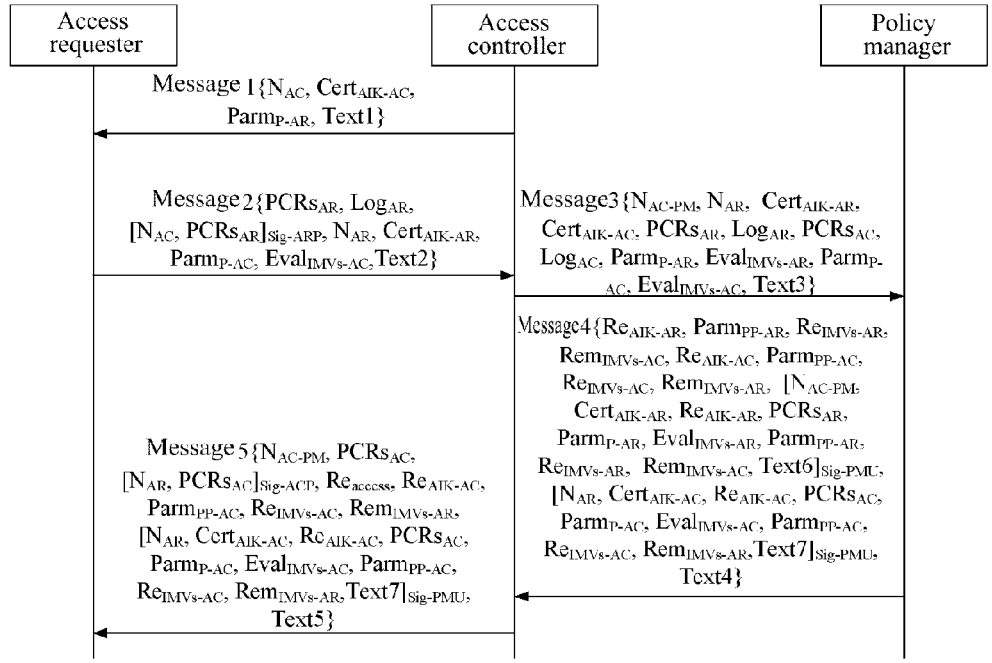
FIG. 3 is a flow chat of a second embodiment in the first mode according to the invention.

Referring to FIGS. 2 and 3, the invention includes the following operations 1-6 in the first mode.

The operation 1 is to perform configuration and initialization. Particularly, the operation 1 includes the following operations 11-12.

In the operation 11, a network user configures an access requester with a security policy for an access controller, including a platform evaluation policy of the access requester for the access controller; and a network administrator configures the access controller with a security policy for the access requester, including a platform evaluation policy of the access controller for the access requester. Particularly, the platform evaluation policy of the access controller for the access requester may be configured dynamically as in a following operation 42.

In the operation 12, the access requester and the access controller load and initialize respective integrity measurement collectors, and a policy manager loads and initializes an integrity measurement verifier.

Particularly, the operation 12 may include the following operations 121-123.

In the operation 121, when a TNC client is started, the TNC client firstly loads respective integrity measurement collectors of the access requester via an Integrity Measurement Collector Interface (IF-IMC) of the access requester and then initializes the respective integrity measurement collectors of the access requester via the Integrity Measurement Collector Interface (IF-IMC) of the access requester, where the TNC client may verify the respective integrity measurement collectors of the access requester for integrity during loading.

In the operation 122, when a TNC access point is started, the TNC access point firstly loads respective integrity measurement collectors of the access controller via an Integrity Measurement Collector Interface (IF-IMC) of the access controller and then initializes the respective integrity measurement collectors of the access controller via the Integrity Measurement Collector Interface (IF-IMC) of the access controller, where the TNC access point may verify the respective integrity measurement collectors of the access controller for integrity during loading.

In the operation 123, when an evaluation policy server is started, the evaluation policy server firstly loads respective integrity measurement verifiers via an Integrity Measurement Verifier Interface (IF-IMV) and then initializes the respective integrity measurement verifiers via the Integrity Measurement Verifier Interface (IF-IMV), where the evaluation policy server may verify the respective integrity measurement verifiers for integrity during loading.

The operation 2 is to request a network connection: a network access requester transmits a network connection request to a network access controller, and the network access controller receives the network connection request.

The operation 3 is to perform user identity authentication. Particularly, the operation 3 includes the following operations 31-33.

In the operation 31, if the access requester or the access controller does not require user identity authentication, then the flow branches to the operation 33;

In the operation 32, if the access requester or the access controller requires user identity authentication, then when the access requester and the access controller have not performed user identity authentication, the network access requester and the network access controller execute a tri-element peer authentication protocol with an authentication policy server being a trusted party to perform user identity authentication and key negotiation between the access requester and the access controller and then the operation 33 is executed; or when the access requester and the access controller have performed user identity authentication, the network access requester and the network access controller may perform user identity authentication and key negotiation between the access requester and the access controller based upon performed user identity authentication or may execute the tri-element peer authentication protocol again based upon the authentication policy server being a trusted party to perform user identity authentication and key negotiation between the access requester and the access controller and perform the operation 33; and In the operation 33, if the access requester or the access controller requires prompt making of an access decision, then when the access requester or the access controller does not require user identity authentication, each of the network access requester and the network access controller makes an access decision according to a local security policy to perform access control; or when the access requester or the access controller requires user identity authentication, each of the network access requester and the network access controller makes an access decision according to a user identity authentication result of the opposite party and the local security policy to perform access control; otherwise, the network access requester requests platform authentication from the TNC client or the network access controller requests platform authentication from the TNC access point.

The operation 4 is to perform platform authentication. Particularly, the operation 4 includes the following operations 41-45.

In the operation 41, if the access requester or the access controller requires online requesting of a platform identity certificate from the policy manager, then the network access requester or the network access controller requests online a platform identity certificate from the evaluation policy server.

In the operation 42, if the network administrator has not configured the access controller with a platform evaluation policy for the access requester, then the TNC access point requests a platform evaluation policy for the access requester from the evaluation policy server, and then the evaluation policy server transmits the platform evaluation policy of the access controller for the access requester to the TNC access point, and the TNC access point performs configuration upon reception of the platform evaluation policy of the access controller for the access requester.

In the operation 43, the access requester and the access controller execute the tri-element peer authentication protocol with the policy manager being a trusted party to perform platform authentication (including platform identity verification and platform integrity evaluation) between the access requester and the access controller, where the policy manager is responsible for platform identity certificate verification and integrity measurement verifier-level evaluation of platform integrity for the access requester and the access controller, particularly in the following operations 431-436 as illustrated in FIGS. 2 and 3:

In the operation 431, the TNC access point firstly generates platform integrity measurement information $Parm_{P\text{-}AR}$ requested by the access controller from the access requester and an integrity measurement verifier-level evaluation policy $Eval_{IMVs\text{-}AR}$ of platform integrity of the access controller for the access requester according to the platform evaluation policy for the access requester and then transmits to the TNC client a message 1 including an authentication identifier $N_{AC}$ of the access controller, a platform identity certificate $Cert_{AIK\text{-}AC}$ of the access controller, the platform integrity measurement information $Parm_{P\text{-}AR}$ requested by the access controller from the access requester, and another parameter Text1;

In the operation 432, upon reception of the message 1, the TNC client firstly acquires a corresponding platform integrity measurement log $Log_{AR}$ of the access requester from the respective integrity measurement collectors of the access requester according to the platform integrity measurement information $Parm_{P\text{-}AR}$ requested by the access controller from the access requester, then acquires a corresponding platform configuration register value $PCRs_{AR}$ of the access requester and a signature $[N_{AC}, PCRs_{AR}]_{Sig\text{-}ARP}$ performed with a private key corresponding to a platform identity certificate $Cert_{AIK\text{-}AR}$ of the access requester on the authentication identifier $N_{AC}$ of the access controller and the platform configuration register value $PCRs_{AR}$ of the access requester from a trusted platform module of the access requester according to the platform integrity measurement log $Log_{AR}$ of the access requester, next generates platform integrity measurement information $Parm_{P\text{-}AC}$ requested by the access requester from the access controller and an integrity measurement verifier-level evaluation policy $Eval_{IMVs\text{-}AC}$ of platform integrity of the access requester for the access controller according to the platform evaluation policy for the access controller and finally transmits to the TNC access point a message 2 including the platform configuration register value $PCRs_{AR}$ of the access requester, the platform integrity measurement log $Log_{AR}$ of the access requester, the signature $[N_{AC}, PCRs_{AR}]_{Sig\text{-}ARP}$ performed with the private key corresponding to the platform identity certificate $Cert_{AIK\text{-}AR}$ of the access requester on the authentication identifier $N_{AC}$ of the access controller and the platform configuration register value $PCRs_{AR}$ of the access requester, a challenge $N_{AR}$ of the access requester, the platform identity certificate $Cert_{AIK\text{-}AR}$ of the access requester, the platform integrity measurement information $Parm_{P\text{-}AC}$ requested by the access requester from the access controller, the integrity measurement verifier-level evaluation policy $Eval_{IMVs\text{-}AC}$ of platform integrity of the access requester for the access controller, and another parameter Text2;

In the operation 433, upon reception of the message 2, the TNC access point firstly verifies for validity the signature $[N_{AC}, PCRs_{AR}]_{Sig-ARP}$ performed with the private key corresponding to the platform identity certificate $Cert_{AIK-AR}$ of the access requester on the authentication identifier $N_{AC}$ of the access controller and the platform configuration register value $PCRs_{AR}$ of the access requester, and if verification fails, then the TNC access point discards the message 2; otherwise, the TNC access point acquires a corresponding platform integrity measurement log $Log_{AC}$ of the access controller from the respective integrity measurement collectors of the access controller according to the platform integrity measurement information $Parm_{P-AC}$ requested by the access requester from the access controller, then acquires a corresponding platform configuration register value $PCRs_{AC}$ of the access controller and a signature $[N_{AR}, PCRs_{AC}]_{Sig-ACP}$ performed with a private key corresponding to the platform identity certificate $Cert_{AIK-AC}$ of the access controller on the challenge $N_{AR}$ of the access requester and the platform configuration register value $PCRs_{AC}$ of the access controller from a trusted computation module of the access controller according to the platform integrity measurement log $Log_{AC}$ of the access controller and finally transmits to the evaluation policy server a message 3 including a challenge $N_{AC-PM}$ of the access controller, the challenge $N_{AR}$ of the access requester, the platform identity certificate $Cert_{AIK-AR}$ of the access requester, the platform identity certificate $Cert_{AIK-AC}$ of the access controller, the platform configuration register value $PCRs_{AR}$ of the access requester, the platform integrity measurement log $Log_{AR}$ of the access requester, the platform configuration register value $PCRs_{AC}$ of the access controller, the platform integrity measurement log $Log_{AC}$ of the access controller, the platform integrity measurement information $Parm_{P-AR}$ requested by the access controller from the access requester, the integrity measurement verifier-level evaluation policy $Eval_{IMVs-AR}$ of platform integrity of the access controller for the access requester, the platform integrity measurement information $Parm_{P-AC}$ requested by the access requester from the access controller, the integrity measurement verifier-level evaluation policy $Eval_{IMVs-AC}$ of platform integrity of the access requester for the access controller, and another parameter Text3;

In the operation 434, upon reception of the message 3, the evaluation policy server firstly generates a verification result $Re_{AIK-AR}$ of the platform identity certificate of the access requester and a verification result $Re_{AIK-AC}$ of the platform identity certificate of the access controller, and if the platform identity certificate of the access requester is valid, then the evaluation policy server firstly verifies the platform integrity measurement log $Log_{AR}$ of the access requester for correctness against the platform configuration register value $PCRs_{AR}$ of the access requester, and if the platform integrity measurement log $Log_{AR}$ of the access requester is incorrect, then the evaluation policy server discards the message 3; otherwise, the evaluation policy server transmits the platform integrity measurement log $Log_{AR}$ of the access requester, the integrity measurement verifier-level evaluation policy $Eval_{IMVs-AR}$ of platform integrity of the access controller for the access requester and the platform integrity measurement information $Parm_{P-AR}$ requested by the access controller from the access requester to the respective integrity measurement verifiers, and then the respective integrity measurement verifiers generate, from the platform integrity measurement log $Log_{AR}$ of the access requester, the integrity measurement verifier-level evaluation policy $Eval_{IMVs-AR}$ of platform integrity of the access controller for the access requester and the platform integrity measurement information $Parm_{P-AR}$ requested by the access controller from the access requester, and transmit, to the evaluation policy server, an integrity measurement verifier-level evaluation result $Re_{IMVs-AR}$ of platform integrity of the access requester and integrity measurement verifier-level remediation information $Rem_{IMVs-AR}$ of platform integrity of the access requester; and if the platform identity certificate of the access controller is valid, then the evaluation policy server firstly verifies the platform integrity measurement log $Log_{AC}$ of the access controller for correctness against the platform configuration register value $PCRs_{AC}$ of the access controller, and if the platform integrity measurement log $Log_{AC}$ of the access controller is incorrect, then the message 3 is discarded; otherwise, the evaluation policy server transmits the platform integrity measurement log $Log_{AC}$ of the access controller, the integrity measurement verifier-level evaluation policy $Eval_{IMVs-AC}$ of platform integrity of the access requester for the access controller and the platform integrity measurement information $Parm_{P-AC}$ requested by the access requester from the access controller to the respective integrity measurement verifiers, and then the respective integrity measurement verifiers generate, from the platform integrity measurement log $Log_{AC}$ of the access controller, the integrity measurement verifier-level evaluation policy $Eval_{IMVs-AC}$ of platform integrity of the access requester for the access controller and the platform integrity measurement information $Parm_{P-AC}$ requested by the access requester from the access controller, and transmit, to the evaluation policy server, an integrity measurement verifier-level evaluation result $Re_{IMVs-AC}$ of platform integrity of the access controller and integrity measurement verifier-level remediation information $Rem_{IMVs-AC}$ of platform integrity of the access controller; and the evaluation policy server then generates actually received platform integrity measurement information $Parm_{PP-AR}$ of the access requester from the platform integrity measurement log $Log_{AR}$ of the access requester, generates actually received platform integrity measurement information $Parm_{PP-AC}$ of the access controller from the platform integrity measurement log $Log_{AC}$ of the access controller and finally transmits a message 4 to the TNC access point. Particularly, the message 4 is constituted in two forms, where in the first form, the message 4 includes the verification result $Re_{AIK-AR}$ of the platform identity certificate of the access requester, the integrity measurement verifier-level evaluation result $Re_{IMVs-AR}$ of platform integrity of the access requester, the integrity measurement verifier-level remediation information $Rem_{IMVs-AR}$ of platform integrity of the access requester, the actually received platform integrity measurement information $Parm_{PP-AR}$ of the access requester, the verification result $Re_{AIK-AC}$ of the platform identity certificate of the access controller, the integrity measurement verifier-level evaluation result $Re_{IMVs-AC}$ of platform integrity of the access controller, the integrity measurement verifier-level remediation information $Rem_{IMVs-AC}$ of platform integrity of the access controller, the actually received platform integrity measurement information $Parm_{PP-AC}$ of the access controller, a signature $[N_{AC-PM}, Cert_{AIK-AR}, Re_{AIK-AR}, PCRs_{AR}, Parm_{P-AR}, Eval_{IMVs-AR}, Parm_{PP-AR}, Re_{IMVs-AR}, Rem_{IMVs-AR}, N_{AR}, Cert_{AIK-AC}, Re_{AIK-AC}, PCRs_{AC}, Parm_{P-AC}, Eval_{IMVs-AC}, Parm_{PP-AC}, Re_{IMVs-AC}, Rem_{IMVs-AC}, Text6]_{Sig-PMU}$ performed with a private key corresponding to a user identity certificate $Cert_{User-PM}$ of the policy manager on the challenge $N_{AC-PM}$ of the access controller, the platform identity certificate $Cert_{AIK-AR}$ of the access requester, the verification result $Re_{AIK-AR}$ of the platform identity certificate of the access requester, the platform configuration register value $PCRs_{AR}$ of the access requester, the platform integrity measurement information $Parm_{P-AR}$ requested by the access controller from the access requester, the integrity measurement verifier-level evaluation policy $Eval_{IMVs-AR}$ of platform integrity of the access controller for the access requester, the actually received platform integrity measurement information $\text{Parm}_{PP-AR}$ of the access requester, the integrity measurement verifier-level evaluation result $\text{Re}_{IMVs-AR}$ of platform integrity of the access requester, the integrity measurement verifier-level remediation information $\text{Rem}_{IMVs-AR}$ of platform integrity of the access requester, the challenge $N_{AR}$ of the access requester, the platform identity certificate $\text{Cert}_{AIK-AC}$ of the access controller, the verification result $\text{Re}_{AIK-AC}$ of the platform identity certificate of the access controller, the platform configuration register value $\text{PCRs}_{AC}$ of the access controller, the platform integrity measurement information $\text{Parm}_{P-AC}$ requested by the access requester from the access controller, the integrity measurement verifier-level evaluation policy $\text{Eval}_{IMVs-AC}$ of platform integrity of the access requester for the access controller, the actually received platform integrity measurement information $\text{Parm}_{PP-AC}$ of the access controller, the integrity measurement verifier-level evaluation result $\text{Re}_{IMVs-AC}$ of platform integrity of the access controller, the integrity measurement verifier-level remediation information $\text{Rem}_{IMVs-AC}$ of platform integrity of the access controller and another parameter Text6, and another parameter Text 4; and in the second form, the message 4 includes the verification result $\text{Re}_{AIK-AR}$ of the platform identity certificate of the access requester, the integrity measurement verifier-level evaluation result $\text{Re}_{IMVs-AR}$ of platform integrity of the access requester, the integrity measurement verifier-level remediation information $\text{Rem}_{IMVs-AR}$ of platform integrity of the access requester, the actually received platform integrity measurement information $\text{Parm}_{PP-AR}$ of the access requester, the verification result $\text{Re}_{AIK-AC}$ of the platform identity certificate of the access controller, the integrity measurement verifier-level evaluation result $\text{Re}_{IMVs-AC}$ of platform integrity of the access controller, the integrity measurement verifier-level remediation information $\text{Rem}_{IMVs-AC}$ of platform integrity of the access controller, the actually received platform integrity measurement information $\text{Parm}_{PP-AC}$ of the access controller, a signature $[N_{AC-PM}, \text{Cert}_{AIK-AR}, \text{Re}_{AIK-AR}, \text{PCRs}_{AR}, \text{Parm}_{P-AR}, \text{Eval}_{IMVs-AR}, \text{Parm}_{PP-AR}, \text{Re}_{IMVs-AR}, \text{Rem}_{IMVs-AC}, \text{another parameter Text6}]_{Sig-PMU}$ performed with the private key corresponding to the user identity certificate $\text{Cert}_{User-PM}$ of the policy manager on the challenge $N_{AC-PM}$ of the access controller, the platform identity certificate $\text{Cert}_{AIK-AR}$ of the access requester, the verification result $\text{Re}_{AIK-AR}$ of the platform identity certificate of the access requester, the platform configuration register value $\text{PCRs}_{AR}$ of the access requester, the platform integrity measurement information $\text{Parm}_{P-AR}$ requested by the access controller from the access requester, the integrity measurement verifier-level evaluation policy $\text{Eval}_{IMVs-AR}$ of platform integrity of the access controller for the access requester, the actually received platform integrity measurement information $\text{Parm}_{PP-AR}$ of the access requester, the integrity measurement verifier-level evaluation result $\text{Re}_{IMVs-AR}$ of platform integrity of the access requester, the integrity measurement verifier-level remediation information $\text{Rem}_{IMVs-AC}$ of platform integrity of the access controller and another parameter Text6, a signature $[N_{AR}, \text{Cert}_{AIK-AC}, \text{Re}_{AIK-AC}, \text{PCRs}_{AC}, \text{Parm}_{P-AC}, \text{Eval}_{IMVs-AC}, \text{Parm}_{PP-AC}, \text{Re}_{IMVs-AC}, \text{Rem}_{IMVs-AR}, \text{another parameter Text7}]_{Sig-PMU}$ performed with the private key corresponding to the user identity certificate $\text{Cert}_{User-PM}$ of the policy manager on the challenge $N_{AR}$ of the access requester, the platform identity certificate $\text{Cert}_{AIK-AC}$ of the access controller, the verification result $\text{Re}_{AIK-AC}$ of the platform identity certificate of the access controller, the platform configuration register value $\text{PCRs}_{AC}$ of the access controller, the platform integrity measurement information $\text{Parm}_{P-AC}$ requested by the access requester from the access controller, the integrity measurement verifier-level evaluation policy $\text{Eval}_{IMVs-AC}$ of platform integrity of the access requester for the access controller, the actually received platform integrity measurement information $\text{Parm}_{PP-AC}$ of the access controller, the integrity measurement verifier-level evaluation result $\text{Re}_{IMVs-AC}$ of platform integrity of the access controller, the integrity measurement verifier-level remediation information $\text{Rem}_{IMVs-AR}$ of platform integrity of the access requester and another parameter Text7, and another parameter Text 4;

In the operation 435, upon reception of the message 4, if the message 4 is constituted in the first form, then the TNC access point firstly verifies for validity the signature $[N_{AC-PM}, \text{Cert}_{AIK-AR}, \text{Re}_{AIK-AR}, \text{PCRs}_{AR}, \text{Parm}_{P-AR}, \text{Eval}_{IMVs-AR}, \text{Parm}_{PP-AR}, \text{Re}_{IMVs-AR}, \text{Rem}_{IMVs-AR}, N_{AR}, \text{Cert}_{AIK-AC}, \text{Re}_{AIK-AC}, \text{PCRs}_{AC}, \text{Parm}_{P-AC}, \text{Eval}_{IMVs-AC}, \text{Parm}_{PP-AC}, \text{Re}_{IMVs-AC}, \text{Rem}_{IMVs-AC}, \text{Text6}]_{Sig-PMU}$ performed with the private key corresponding to the user identity certificate $\text{Cert}_{User-PM}$ of the policy manager on the challenge $N_{AC-PM}$ of the access controller, the platform identity certificate $\text{Cert}_{AIK-AR}$ of the access requester, the verification result $\text{Re}_{AIK-AR}$ of the platform identity certificate of the access requester, the platform configuration register value $\text{PCRs}_{AR}$ of the access requester, the platform integrity measurement information $\text{Parm}_{P-AR}$ requested by the access controller from the access requester, the integrity measurement verifier-level evaluation policy $\text{Eval}_{IMVs-AR}$ of platform integrity of the access controller for the access requester, the actually received platform integrity measurement information $\text{Parm}_{PP-AR}$ of the access requester, the integrity measurement verifier-level evaluation result $\text{Re}_{IMVs-AR}$ of platform integrity of the access requester, the integrity measurement verifier-level remediation information $\text{Rem}_{IMVs-AR}$ of platform integrity of the access requester, the challenge $N_{AR}$ of the access requester, the platform identity certificate $\text{Cert}_{AIK-AC}$ of the access controller, the verification result $\text{Re}_{AIK-AC}$ of the platform identity certificate of the access controller, the platform configuration register value $\text{PCRs}_{AC}$ of the access controller, the platform integrity measurement information $\text{Parm}_{P-AC}$ requested by the access requester from the access controller, the integrity measurement verifier-level evaluation policy $\text{Eval}_{IMVs-AC}$ of platform integrity of the access requester for the access controller, the actually received platform integrity measurement information $\text{Parm}_{PP-AC}$ of the access controller, the integrity measurement verifier-level evaluation result $\text{Re}_{IMVs-AC}$ of platform integrity of the access controller, the integrity measurement verifier-level remediation information $\text{Rem}_{IMVs-AC}$ of platform integrity of the access controller and another parameter Text6, and if verification fails, then the TNC access point discards the message 4; otherwise, the TNC access point transmits the integrity measurement verifier-level remediation information $\text{Rem}_{IMVs-AC}$ of platform integrity of the access controller to the corresponding integrity measurement collector of the access controller and finally transmits to the TNC client a message 5 (constituted in a first form) including the challenge $N_{AC-PM}$ of the access controller, the platform configuration register value $\text{PCRs}_{AC}$ of the access controller, the signature $[N_{AR}, \text{PCRs}_{AC}]_{Sig-ACP}$ performed with the private key corresponding to the platform identity certificate $\text{Cert}_{AIK-AC}$ of the access controller on the challenge $N_{AR}$ of the access requester and the platform configuration register value $\text{PCRs}_{AC}$ of the access controller, the integrity measurement verifier-level evaluation policy $\text{Eval}_{IMVs-AR}$ of platform integrity of the access controller for the access requester, a platform authentication result $\text{Re}_{access}$ on the access requester, the message 4 and another parameter Text 5; and if the message 4 is constituted in the second form, then the TNC access point firstly verifies for validity the signature [$N_{AC-PM}$, $Cert_{AIK-AR}$, $Re_{AIK-AR}$, $PCRs_{AR}$, $Parm_{P-AR}$, $Eval_{IMVs-AR}$, $Parm_{PP-AR}$, $Re_{IMVs-AR}$, $Rem_{IMVs-AC}$, another parameter Text6]$_{Sig-PMU}$ performed with the private key corresponding to the user identity certificate $Cert_{User-PM}$ of the policy manager on the challenge $N_{AC-PM}$ of the access controller, the platform identity certificate $Cert_{AIK-AR}$ of the access requester, the verification result $Re_{AIK-AR}$ of the platform identity certificate of the access requester, the platform configuration register value $PCRs_{AR}$ of the access requester, the platform integrity measurement information $Parm_{P-AR}$ requested by the access controller from the access requester, the integrity measurement verifier-level evaluation policy $Eval_{IMVs-AR}$ of platform integrity of the access controller for the access requester, the actually received platform integrity measurement information $Parm_{PP-AR}$ of the access requester, the integrity measurement verifier-level evaluation result $Re_{IMVs-AR}$ of platform integrity of the access requester, the integrity measurement verifier-level remediation information $Rem_{IMVs-AC}$ of platform integrity of the access controller and another parameter Text6, and if verification fails, then the TNC access point discards the message 4; otherwise, the TNC access point transmits the integrity measurement verifier-level remediation information $Rem_{IMVs-AC}$ of platform integrity of the access controller to the corresponding integrity measurement collector of the access controller and finally transmits to the TNC client a message 5 (constituted in a second form) including the challenge $N_{AC-PM}$ of the access controller, the platform configuration register value $PCRs_{AC}$ of the access controller, the signature [$N_{AR}$, $PCRs_{AC}$]$_{Sig-ACP}$ performed with the private key corresponding to the platform identity certificate $Cert_{AIK-AC}$ of the access controller on the challenge $N_{AR}$ of the access requester and the platform configuration register value $PCRs_{AC}$ of the access controller, the platform authentication result $Re_{access}$ on the access requester, the verification result $Re_{AIK-AC}$ of the platform identity certificate of the access controller, the integrity measurement verifier-level evaluation result $Re_{IMVs-AC}$ of platform integrity of the access controller, the integrity measurement verifier-level remediation information $Rem_{IMVs-AR}$ of platform integrity of the access requester, the actually received platform integrity measurement information $Parm_{PP-AC}$ of the access controller, the signature [$N_{AR}$, $Cert_{AIK-AC}$, $Re_{AIK-AC}$, $PCRs_{AC}$, $Parm_{P-AC}$, $Eval_{IMVs-AC}$, $Parm_{PP-AC}$, $Re_{IMVs-AC}$, $Rem_{IMVs-AR}$, another parameter Text7]$_{Sig-PMU}$ performed with the private key corresponding to the user identity certificate $Cert_{User-PM}$ of the policy manager on the challenge $N_{AR}$ of the access requester, the platform identity certificate $Cert_{AIK-AC}$ of the access controller, the verification result $Re_{AIK-AC}$ of the platform identity certificate of the access controller, the platform configuration register value $PCRs_{AC}$ of the access controller, the platform integrity measurement information $Parm_{P-AC}$ requested by the access requester from the access controller, the integrity measurement verifier-level evaluation policy $Eval_{IMVs-AC}$ of platform integrity of the access requester for the access controller, the actually received platform integrity measurement information $Parm_{PP-AC}$ of the access controller, the integrity measurement verifier-level evaluation result $Re_{IMVs-AC}$ of platform integrity of the access controller, the integrity measurement verifier-level remediation information $Rem_{IMVs-AR}$ of platform integrity of the access requester and another parameter Text7, and another parameter Text5; and In the operation 436, upon reception of the message 5, if the message 5 is constituted in the first form, then the TNC client firstly verifies for validity the signature [$N_{AR}$, $PCRs_{AC}$]$_{Sig-ACP}$ performed with the private key corresponding to the platform identity certificate $Cert_{AIK-AC}$ of the access controller on the challenge $N_{AR}$ of the access requester and the platform configuration register value $PCRs_{AC}$ of the access controller, and if verification fails, then the TNC client discards the message 5; otherwise, the TNC client verifies for validity the signature [$N_{AC-PM}$, $Cert_{AIK-AR}$, $Re_{AIK-AR}$, $PCRs_{AR}$, $Parm_{P-AR}$, $Eval_{IMVs-AR}$, $Parm_{PP-AR}$, $Re_{IMVs-AR}$, $Rem_{IMVs-AR}$, $N_{AR}$, $Cert_{AIK-AC}$, $Re_{AIK-AC}$, $PCRs_{AC}$, $Parm_{P-AC}$, $Eval_{IMVs-AC}$, $Parm_{PP-AC}$, $Re_{IMVs-AC}$, $Rem_{IMVs-AC}$, Text6]$_{Sig-PMU}$ performed with the private key corresponding to the user identity certificate $Cert_{User-PM}$ of the policy manager on the challenge $N_{AC-PM}$ of the access controller, the platform identity certificate $Cert_{AIK-AR}$ of the access requester, the verification result $Re_{AIK-AR}$ of the platform identity certificate of the access requester, the platform configuration register value $PCRs_{AR}$ of the access requester, the platform integrity measurement information $Parm_{P-AR}$ requested by the access controller from the access requester, the integrity measurement verifier-level evaluation policy $Eval_{IMVs-AR}$ of platform integrity of the access controller for the access requester, the actually received platform integrity measurement information $Parm_{PP-AR}$ of the access requester, the integrity measurement verifier-level evaluation result $Re_{IMVs-AR}$ of platform integrity of the access requester, the integrity measurement verifier-level remediation information $Rem_{IMVs-AR}$ of platform integrity of the access requester, the challenge $N_{AR}$ of the access requester, the platform identity certificate $Cert_{AIK-AC}$ of the access controller, the verification result $Re_{AIK-AC}$ of the platform identity certificate of the access controller, the platform configuration register value $PCRs_{AC}$ of the access controller, the platform integrity measurement information $Parm_{P-AC}$ requested by the access requester from the access controller, the integrity measurement verifier-level evaluation policy $Eval_{IMVs-AC}$ of platform integrity of the access requester for the access controller, the actually received platform integrity measurement information $Parm_{PP-AC}$ of the access controller, the integrity measurement verifier-level evaluation result $Re_{IMVs-AC}$ of platform integrity of the access controller, the integrity measurement verifier-level remediation information $Rem_{IMVs-AC}$ of platform integrity of the access controller and another parameter Text6, and if verification fails, then the TNC client discards the message 5; otherwise, the TNC client transmits the integrity measurement verifier-level remediation information $Rem_{IMVs-AR}$ of platform integrity of the access requester to the corresponding integrity measurement collector of the access requester; or if the message 5 is constituted in the second form, then the TNC client firstly verifies for validity the signature [$N_{AR}$, $PCRs_{AC}$]$_{Sig-ACP}$ performed with the private key corresponding to the platform identity certificate $Cert_{AIK-AC}$ of the access controller on the challenge $N_{AR}$ of the access requester and the platform configuration register value $PCRs_{AC}$ of the access controller, and if verification fails, then the TNC client discards the message 5; otherwise, the TNC client verifies for validity the signature [$N_{AR}$, $Cert_{AIK-AC}$, $Re_{AIK-AC}$, $PCRs_{AC}$, $Parm_{P-AC}$, $Eval_{IMVs-AC}$, $Parm_{PP-AC}$, $Re_{IMVs-AC}$, $Rem_{IMVs-AR}$, another parameter Text7]$_{Sig-PMU}$ performed with the private key corresponding to the user identity certificate $Cert_{User-PM}$ of the policy manager on the challenge $N_{AR}$ of the access requester, the platform identity certificate $Cert_{AIK-AC}$ of the access controller, the verification result $Re_{AIK-AC}$ of the platform identity certificate of the access controller, the platform configuration register value $PCRs_{AC}$ of the access controller, the platform integrity measurement information $Parm_{P-AC}$ requested by the access requester from the access controller, the integrity measurement verifier-level evaluation policy $Eval_{IMVs-AC}$ of platform integrity of the access requester for the access controller, the actually received platform integrity measurement information $Parm_{PP\text{-}AC}$ of the access controller, the integrity measurement verifier-level evaluation result $Re_{IMVs\text{-}AC}$ of platform integrity of the access controller, the integrity measurement verifier-level remediation information $Rem_{IMVs\text{-}AR}$ of platform integrity of the access requester and another parameter Text7, and if verification fails, then the TNC client discards the message 5; otherwise, it transmits the integrity measurement verifier-level remediation information $Rem_{IMVs\text{-}AR}$ of platform integrity of the access requester to the corresponding integrity measurement collector of the access requester.

In the operation 44, if the actually received platform integrity measurement information $Parm_{PP\text{-}AR}$ of the access requester differs from the platform integrity measurement information $Parm_{P\text{-}AR}$ requested by the access controller from the access requester or the actually received platform integrity measurement information $Parm_{PP\text{-}AC}$ of the access controller differs from the platform integrity measurement information $Parm_{P\text{-}AC}$ requested by the access requester from the access controller, then the operation 43 shall be performed again until each of the access requester and the access controller has performed platform integrity evaluation on the opposite party according to the configured platform evaluation policy, and the TNC client generates a platform-level evaluation result $Re_{P\text{-}AC}$ of platform integrity of the access controller from the platform evaluation policy for the access controller and the integrity measurement verifier-level evaluation result $Re_{IMVs\text{-}AC}$ of platform integrity of the access controller, then generates a platform authentication result on the access controller from the platform evaluation policy for the access controller, the verification result $Re_{AIK\text{-}AC}$ of the platform identity certificate of the access controller and the platform-level evaluation result $Re_{P\text{-}AC}$ of platform integrity of the access controller and finally transmits the platform authentication result on the access controller to the network access requester; and the TNC access point generates a platform-level evaluation result $Re_{P\text{-}AR}$ of platform integrity of the access requester from the platform evaluation policy for the access requester and the integrity measurement verifier-level evaluation result $Re_{IMVs\text{-}AR}$ of platform integrity of the access requester, then generates a platform authentication result $Re_{access}$ on the access requester from the platform evaluation policy for the access requester, the verification result $Re_{AIK\text{-}AR}$ of the platform identity certificate of the access requester and the platform-level evaluation result $Re_{P\text{-}AR}$ of platform integrity of the access requester and finally transmits the platform authentication result $Re_{access}$ on the access requester to the network access controller.

In the operation 45, when the access requester or the access controller does not require user identity authentication, each of the network access requester and the network access controller makes an access decision according to the local security policy and the platform authentication result on the opposite party to perform access control; or when the access requester or the access controller requires user identity authentication, each of the network access requester and the network access controller makes an access decision according to a user identity authentication result of the opposite party, the platform authentication result on the opposite party and the local security policy to perform access control.

The operation 5 is to perform another platform authentication after platform repair. Particularly, the operation 5 includes the following operations 51-52.

In the operation 51, if the access requester or the access controller requires platform repair after the operation 4 is performed, then the respective integrity measurement collectors of the access requester perform platform repair according to the integrity measurement verifier-level remediation information $Rem_{IMVs\text{-}AR}$ of platform integrity of the access requester or the respective integrity measurement collectors of the access controller perform platform repair according to the integrity measurement verifier-level remediation information $Rem_{IMVs\text{-}AC}$ of platform integrity of the access controller.

In the operation 52, the respective integrity measurement collectors of the access requester trigger the TNC client to perform another platform authentication upon completion of platform repair or the respective integrity measurement collector of the access controller trigger the TNC access point to perform another platform authentication upon completion of platform repair, and the TNC client or TNC access point branches to the operation 2, the operation 3 or the operation 4 dependent upon the local security policy and an influence of platform repair upon network connectivity between the access requester and the access controller.

The operation 6 is to perform another platform authentication activated after platform authentication; and if the respective integrity measurement collector of the access requester or the TNC client and the respective integrity measurement collector of the access controller or the TNC access point are activated according to the local security policy to perform another platform authentication, then the flow branches to the operation 3 or the operation 4 according to the local security policy.

Figure 4:
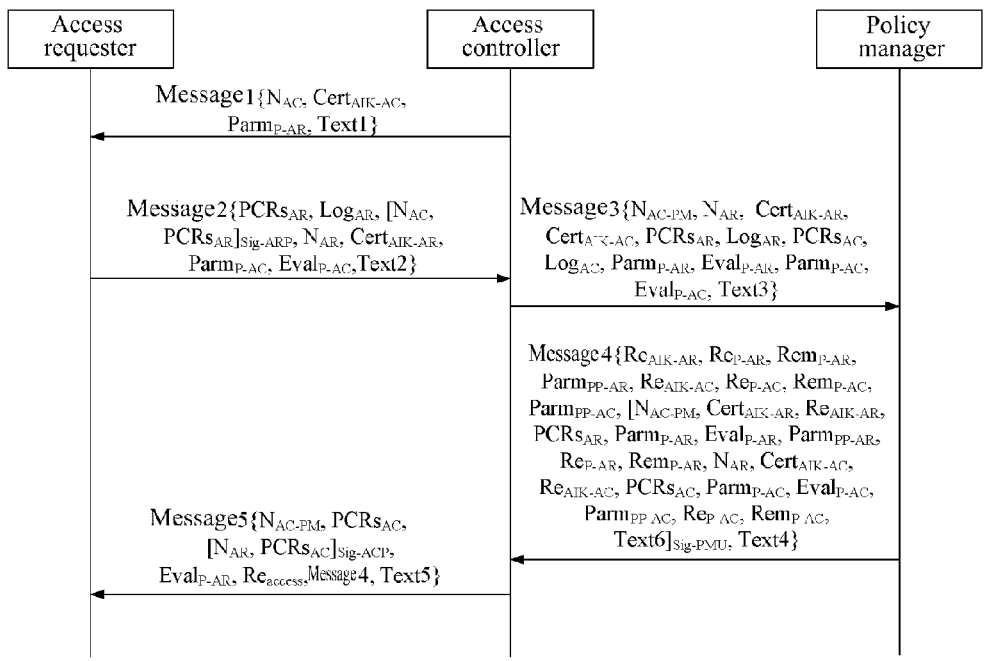
FIG. 4 is a flow chat of a first embodiment in a second mode according to the invention.
Figure 5:
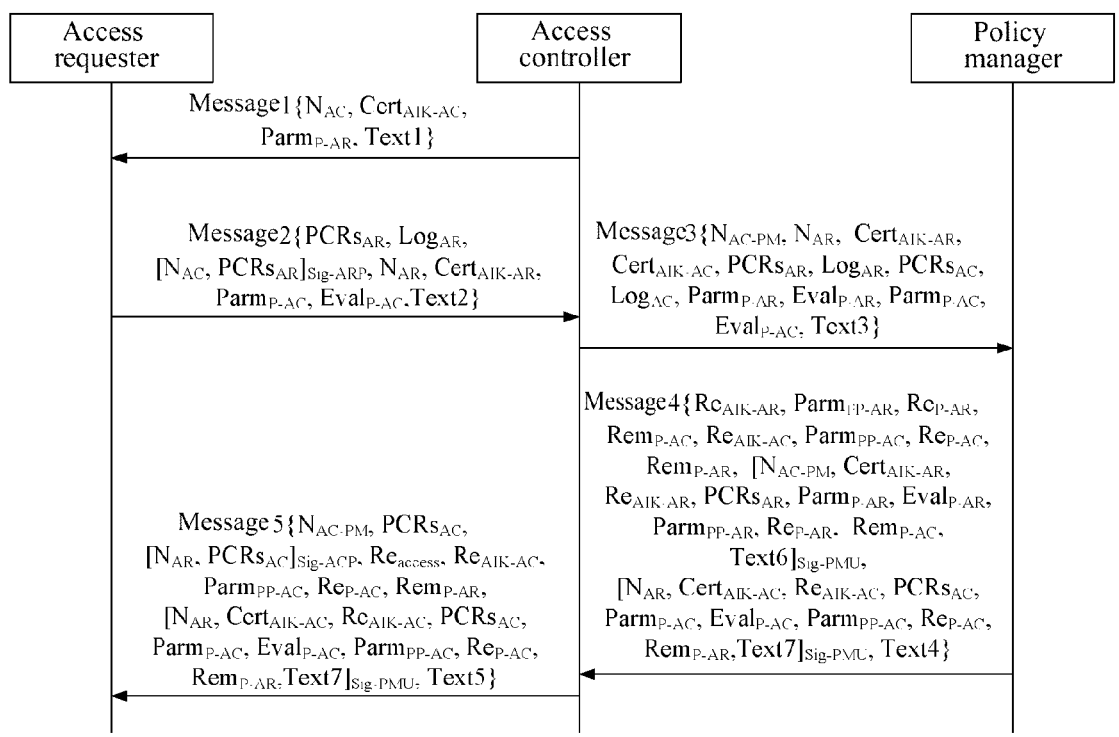
FIG. 5 is a flow chat of a second embodiment in the second mode according to the invention.

FIG. 4 is a flow chart of a first embodiment in a second mode according to the invention, and FIG. 5 is a flow chart of a second embodiment in the second mode according to the invention. Referring to FIGS. 4 and 5, the invention includes the following operations 10-60 in the second mode.

The operation 10 is to perform configuration and initialization. Particularly, the operation 10 includes the following operations 101-102.

In the operation 101, a network user configures an access requester with a security policy for an access controller, including a platform evaluation policy of the access requester for the access controller. A network administrator configures the access controller with a security policy for the access requester, including a platform evaluation policy of the access controller for the access requester. Particularly, the platform evaluation policy of the access controller for the access requester may be configured dynamically as in a following operation 102.

In the operation 102, the access requester and the access controller load and initialize respective integrity measurement collectors, and a policy manager loads and initializes an integrity measurement verifier.

Particularly, the operation 102 may include the following operations 1021-1023.

In the operation 1021, when a TNC client is started, the TNC client firstly loads the respective integrity measurement collectors of the access requester via an Integrity Measurement Collector Interface (IF-IMC) of the access requester and then initializes the respective integrity measurement collectors of the access requester via the Integrity Measurement Collector Interface (IF-IMC) of the access requester, where the TNC client may verify the respective integrity measurement collectors of the access requester for integrity during loading.

In the operation 1022, when a TNC access point is started, the TNC access point firstly loads respective integrity measurement collectors of the access controller via an Integrity Measurement Collector Interface (IF-IMC) of the access controller and then initializes the respective integrity measurement collectors of the access controller via the Integrity Measurement Collector Interface (IF-IMC) of the access controller, where the TNC access point may verify the respective integrity measurement collectors of the access controller for integrity during loading.

In the operation 1023, when an evaluation policy server is started, the evaluation policy server firstly loads respective integrity measurement verifiers via an Integrity Measurement Verifier Interface (IF-IMV) and then initializes the respective integrity measurement verifiers via the Integrity Measurement Verifier Interface (IF-IMV), where the evaluation policy server may verify the respective integrity measurement verifiers for integrity during loading;

The operation 20 is to request a network connection: a network access requester transmits a network connection request to a network access controller, and the network access controller receives the network connection request.

The operation 30 is to perform user identity authentication. Particularly, the operation 30 includes the following operations 301-303.

In the operation 301, if the access requester or the access controller does not require user identity authentication, then the flow branches to the operation 303.

In the operation 302, if the access requester or the access controller requires user identity authentication, then when the access requester and the access controller have not performed user identity authentication, the network access requester and the network access controller execute a tri-element peer authentication protocol with an authentication policy server being a trusted party to perform user identity authentication and key negotiation between the access requester and the access controller and then the operation 303 is executed; or when the access requester and the access controller have performed user identity authentication, the network access requester and the network access controller may perform user identity authentication and key negotiation between the access requester and the access controller based upon performed user identity authentication or may execute the tri-element peer authentication protocol again based upon the authentication policy server being a trusted party to perform user identity authentication and key negotiation between the access requester and the access controller and perform the operation 303.

In the operation 303, if the access requester or the access controller requires prompt making of an access decision, then when the access requester or the access controller does not require user identity authentication, each of the network access requester and the network access controller makes an access decision according to a local security policy to perform access control; or when the access requester or the access controller requires user identity authentication, each of the network access requester and the network access controller makes an access decision according to a user identity authentication result of the opposite party and the local security policy to perform access control; otherwise, the network access requester requests platform authentication from the TNC client or the network access controller requests platform authentication from the TNC access point.

The operation 40 is to perform platform authentication. Particularly, the operation 40 includes the following operations 401-405.

In the operation 401, if the access requester or the access controller requires online requesting of a platform identity certificate from the policy manager, then the network access requester or the network access controller requests online a platform identity certificate from the evaluation policy server.

In the operation 402, if the network administrator has not configured the access controller with a platform evaluation policy for the access requester, then the TNC access point requests a platform evaluation policy for the access requester from the evaluation policy server, and then the evaluation policy server transmits the platform evaluation policy of the access controller for the access requester to the TNC access point, and the TNC access point performs configuration upon reception of the platform evaluation policy of the access controller for the access requester.

In the operation 403, the access requester and the access controller execute the tri-element peer authentication protocol with the policy manager being a trusted party to perform platform authentication (including platform identity verification and platform integrity evaluation) between the access requester and the access controller, where the policy manager is responsible for platform identity certificate verification and platform-level evaluation of platform integrity for the access requester and the access controller, particularly in the following operations 4031-4036 as illustrated in FIGS. 4 and 5:

In the operation 4031, the TNC access point firstly generates platform integrity measurement information $Parm_{P-AR}$ requested by the access controller from the access requester and a platform-level evaluation policy $Eval_{P-AR}$ of platform integrity of the access controller for the access requester according to the platform evaluation policy for the access requester and then transmits to the TNC client a message 1 including an authentication identifier $N_{AC}$ of the access controller, a platform identity certificate $Cert_{AIK-AC}$ of the access controller, the platform integrity measurement information $Parm_{P-AR}$ requested by the access controller from the access requester, and another parameter Text1;

In the operation 4032, upon reception of the message 1, the TNC client firstly acquires a corresponding platform integrity measurement log $Log_{AR}$ of the access requester from the respective integrity measurement collectors of the access requester according to the platform integrity measurement information $Parm_{P-AR}$ requested by the access controller from the access requester, then acquires a corresponding platform configuration register value $PCRs_{AR}$ of the access requester and a signature $[N_{AC}, PCRs_{AR}]_{Sig-ARP}$ performed with a private key corresponding to a platform identity certificate $Cert_{AIK-AR}$ of the access requester on the authentication identifier $N_{AC}$ of the access controller and the platform configuration register value $PCRs_{AR}$ of the access requester from a trusted platform module of the access requester according to the platform integrity measurement log $Log_{AR}$ of the access requester, next generates platform integrity measurement information $Parm_{P-AC}$ requested by the access requester from the access controller and a platform-level evaluation policy $Eval_{P-AC}$ of platform integrity of the access requester for the access controller according to the platform evaluation policy for the access controller and finally transmits to the TNC access point a message 2 including the platform configuration register value $PCRs_{AR}$ of the access requester, the platform integrity measurement log $Log_{AR}$ of the access requester, the signature $[N_{AC}, PCRs_{AR}]_{Sig-ARP}$ performed with the private key corresponding to the platform identity certificate $Cert_{AIK-AR}$ of the access requester on the authentication identifier $N_{AC}$ of the access controller and the platform configuration register value $PCRs_{AR}$ of the access requester, a challenge $N_{AR}$ of the access requester, the platform identity certificate $Cert_{AIK-AR}$ of the access requester, the platform integrity measurement information $Parm_{P-AC}$ requested by the access requester from the access controller, the platform-level evaluation policy $Eval_{P-AC}$ of platform integrity of the access requester for the access controller, and another parameter Text2;

In the operation 4033, upon reception of the message 2, the TNC access point firstly verifies for validity the signature $[N_{AC}, PCRs_{AR}]_{Sig\text{-}ARP}$ performed with the private key corresponding to the platform identity certificate $Cert_{AIK\text{-}AR}$ of the access requester on the authentication identifier $N_{AC}$ of the access controller and the platform configuration register value $PCRs_{AR}$ of the access requester, and if verification fails, then the TNC access point discards the message 2; otherwise, the TNC access point acquires a corresponding platform integrity measurement log $Log_{AC}$ of the access controller from the respective integrity measurement collectors of the access controller according to the platform integrity measurement information $Parm_{P\text{-}AC}$ requested by the access requester from the access controller, then acquires a corresponding platform configuration register value $PCRs_{AC}$ of the access controller and a signature $[N_{AR}, PCRs_{AC}]_{Sig\text{-}ACP}$ performed with a private key corresponding to the platform identity certificate $Cert_{AIK\text{-}AC}$ of the access controller on the challenge $N_{AR}$ of the access requester and the platform configuration register value $PCRs_{AC}$ of the access controller from a trusted computation module of the access controller according to the platform integrity measurement log $Log_{AC}$ of the access controller and finally transmits to the evaluation policy server a message 3 including a challenge $N_{AC\text{-}PM}$ of the access controller, the challenge $N_{AR}$ of the access requester, the platform identity certificate $Cert_{AIK\text{-}AR}$ of the access requester, the platform identity certificate $Cert_{AIK\text{-}AC}$ of the access controller, the platform configuration register value $PCRs_{AR}$ of the access requester, the platform integrity measurement log $Log_{AR}$ of the access requester, the platform configuration register value $PCRs_{AC}$ of the access controller, the platform integrity measurement log $Log_{AC}$ of the access controller, the platform integrity measurement information $Parm_{P\text{-}AR}$ requested by the access controller from the access requester, the platform-level evaluation policy $Eval_{P\text{-}AR}$ of platform integrity of the access controller for the access requester, the platform integrity measurement information $Parm_{P\text{-}AC}$ requested by the access requester from the access controller, the platform-level evaluation policy $Eval_{P\text{-}AC}$ of platform integrity of the access requester for the access controller, and another parameter Text3;

In the operation 4034, upon reception of the message 3, the evaluation policy server firstly generates a verification result $Re_{AIK\text{-}AR}$ of the platform identity certificate of the access requester and a verification result $Re_{AIK\text{-}AC}$ of the platform identity certificate of the access controller, and if the platform identity certificate of the access requester is valid, then the evaluation policy server firstly verifies the platform integrity measurement log $Log_{AR}$ of the access requester for correctness against the platform configuration register value $PCRs_{AR}$ of the access requester, and if the platform integrity measurement log $Log_{AR}$ of the access requester is incorrect, then the evaluation policy server discards the message 3; otherwise, the evaluation policy server transmits the platform integrity measurement log $Log_{AR}$ of the access requester, the platform-level evaluation policy $Eval_{P\text{-}AR}$ of platform integrity of the access controller for the access requester and the platform integrity measurement information $Parm_{P\text{-}AR}$ requested by the access controller from the access requester to the respective integrity measurement verifiers, and then the respective integrity measurement verifiers generate, from the platform integrity measurement log $Log_{AR}$ of the access requester, the platform-level evaluation policy $Eval_{P\text{-}AR}$ of platform integrity of the access controller for the access requester and the platform integrity measurement information $Parm_{P\text{-}AR}$ requested by the access controller from the access requester, and transmit, to the evaluation policy server, a platform-level evaluation result $Re_{P\text{-}AR}$ of platform integrity of the access requester and platform-level remediation information $Rem_{P\text{-}AR}$ of platform integrity of the access requester; and if the platform identity certificate of the access controller is valid, then the evaluation policy server firstly verifies the platform integrity measurement log $Log_{AC}$ of the access controller for correctness against the platform configuration register value $PCRs_{AC}$ of the access controller, and if the platform integrity measurement log $Log_{AC}$ of the access controller is incorrect, then the message 3 is discarded; otherwise, the evaluation policy server transmits the platform integrity measurement log $Log_{AC}$ of the access controller, the platform-level evaluation policy $Eval_{P\text{-}AC}$ of platform integrity of the access requester for the access controller and the platform integrity measurement information $Parm_{P\text{-}AC}$ requested by the access requester from the access controller to the respective integrity measurement verifiers, and then the respective integrity measurement verifiers generate, from the platform integrity measurement log $Log_{AC}$ of the access controller, the platform-level evaluation policy $Eval_{P\text{-}AC}$ of platform integrity of the access requester for the access controller and the platform integrity measurement information $Parm_{P\text{-}AC}$ requested by the access requester from the access controller, and transmit, to the evaluation policy server, a platform-level evaluation result $Re_{P\text{-}AC}$ of platform integrity of the access controller and platform-level remediation information $Rem_{P\text{-}AC}$ of platform integrity of the access controller; and the evaluation policy server then generates actually received platform integrity measurement information $Parm_{PP\text{-}AR}$ of the access requester from the platform integrity measurement log $Log_{AR}$ of the access requester, generates actually received platform integrity measurement information $Parm_{PP\text{-}AC}$ of the access controller from the platform integrity measurement log $Log_{AC}$ of the access controller and finally transmits a message 4 to the TNC access point. Particularly, the message 4 is constituted in two forms, where in the first form, the message 4 includes the verification result $Re_{AIK\text{-}AR}$ of the platform identity certificate of the access requester, the platform-level evaluation result $Re_{P\text{-}AR}$ of platform integrity of the access requester, the platform-level remediation information $Rem_{P\text{-}AR}$ of platform integrity of the access requester, the actually received platform integrity measurement information $Parm_{PP\text{-}AR}$ of the access requester, the verification result $Re_{AIK\text{-}AC}$ of the platform identity certificate of the access controller, the platform-level evaluation result $Re_{P\text{-}AC}$ of platform integrity of the access controller, the platform-level remediation information $Rem_{P\text{-}AC}$ of platform integrity of the access controller, the actually received platform integrity measurement information $Parm_{PP\text{-}AC}$ of the access controller, a signature $[N_{AC\text{-}PM}, Cert_{AIK\text{-}AR}, Re_{AIK\text{-}AR}, PCRs_{AR}, Parm_{P\text{-}AR}, Eval_{P\text{-}AR}, Parm_{PP\text{-}AR}, Re_{P\text{-}AR}, Rem_{P\text{-}AR}, N_{AR}, Cert_{AIK\text{-}AC}, Re_{AIK\text{-}AC}, PCRs_{AC}, Parm_{P\text{-}AC}, Eval_{P\text{-}AC}, Parm_{PP\text{-}AC}, Re_{P\text{-}AC}, Rem_{P\text{-}AC}, Text6]_{Sig\text{-}PMU}$ performed with a private key corresponding to a user identity certificate $Cert_{User\text{-}PM}$ of the policy manager on the challenge $N_{AC\text{-}PM}$ of the access controller, the platform identity certificate $Cert_{AIK\text{-}AR}$ of the access requester, the verification result $Re_{AIK\text{-}AR}$ of the platform identity certificate of the access requester, the platform configuration register value $PCRs_{AR}$ of the access requester, the platform integrity measurement information $Parm_{P\text{-}AR}$ requested by the access controller from the access requester, the platform-level evaluation policy $Eval_{P\text{-}AR}$ of platform integrity of the access controller for the access requester, the actually received platform integrity measurement information $Parm_{PP\text{-}AR}$ of the access requester, the platform-level evaluation result $Re_{P\text{-}AR}$ of platform integrity of the access requester, the platform-level remediation information Rem$_{P\text{-}AR}$ of platform integrity of the access requester, the challenge N$_{AR}$ of the access requester, the platform identity certificate Cert$_{AIK\text{-}AC}$ of the access controller, the verification result Re$_{AIK\text{-}AC}$ of the platform identity certificate of the access controller, the platform configuration register value PCRs$_{AC}$ of the access controller, the platform integrity measurement information Parm$_{P\text{-}AC}$ requested by the access requester from the access controller, the platform-level evaluation policy Eval$_{P\text{-}AC}$ of platform integrity of the access requester for the access controller, the actually received platform integrity measurement information Parm$_{PP\text{-}AC}$ of the access controller, the platform-level evaluation result Re$_{P\text{-}AC}$ of platform integrity of the access controller, the platform-level remediation information Rem$_{P\text{-}AC}$ of platform integrity of the access controller and another parameter Text6, and another parameter Text 4; and in the second form, the message 4 includes the verification result Re$_{AIK\text{-}AR}$ of the platform identity certificate of the access requester, the platform-level evaluation result Re$_{P\text{-}AR}$ of platform integrity of the access requester, the platform-level remediation information Rem$_{P\text{-}AR}$ of platform integrity of the access requester, the actually received platform integrity measurement information Parm$_{PP\text{-}AR}$ of the access requester, the verification result Re$_{AIK\text{-}AC}$ of the platform identity certificate of the access controller, the platform-level evaluation result Re$_{P\text{-}AC}$ of platform integrity of the access controller, the platform-level remediation information Rem$_{P\text{-}AC}$ of platform integrity of the access controller, the actually received platform integrity measurement information Parm$_{PP\text{-}AC}$ of the access controller, a signature [N$_{AC\text{-}PM}$, Cert$_{AIK\text{-}AR}$, Re$_{AIK\text{-}AR}$, PCRs$_{AR}$, Parm$_{P\text{-}AR}$, Eval$_{P\text{-}AR}$, Parm$_{PP\text{-}AR}$, Re$_{P\text{-}AR}$, Rem$_{P\text{-}AC}$, another parameter Text6]$_{Sig\text{-}PMU}$ performed with the private key corresponding to the user identity certificate Cert$_{User\text{-}PM}$ of the policy manager on the challenge N$_{AC\text{-}PM}$ of the access controller, the platform identity certificate Cert$_{AIK\text{-}AR}$ of the access requester, the verification result Re$_{AIK\text{-}AR}$ of the platform identity certificate of the access requester, the platform configuration register value PCRs$_{AR}$ of the access requester, the platform integrity measurement information Parm$_{P\text{-}AR}$ requested by the access controller from the access requester, the platform-level evaluation policy Eval$_{P\text{-}AR}$ of platform integrity of the access controller for the access requester, the actually received platform integrity measurement information Parm$_{PP\text{-}AR}$ of the access requester, the platform-level evaluation result Re$_{P\text{-}AR}$ of platform integrity of the access requester, the platform-level remediation information Rem$_{P\text{-}AC}$ of platform integrity of the access controller and another parameter Text6, a signature [N$_{AR}$, Cert$_{AIK\text{-}AC}$, Re$_{AIK\text{-}AC}$, PCRs$_{AC}$, Parm$_{P\text{-}AC}$, Eval$_{P\text{-}AC}$, Parm$_{PP\text{-}AC}$, Re$_{P\text{-}AC}$, Rem$_{P\text{-}AR}$, another parameter Text7]$_{Sig\text{-}PMU}$ performed with the private key corresponding to the user identity certificate Cert$_{User\text{-}PM}$ of the policy manager on the challenge N$_{AR}$ of the access requester, the platform identity certificate Cert$_{AIK\text{-}AC}$ of the access controller, the verification result Re$_{AIK\text{-}AC}$ of the platform identity certificate of the access controller, the platform configuration register value PCRs$_{AC}$ of the access controller, the platform integrity measurement information Parm$_{P\text{-}AC}$ requested by the access requester from the access controller, the platform-level evaluation policy Eval$_{P\text{-}AC}$ of platform integrity of the access requester for the access controller, the actually received platform integrity measurement information Parm$_{PP\text{-}AC}$ of the access controller, the platform-level evaluation result Re$_{P\text{-}AC}$ of platform integrity of the access controller, the platform-level remediation information Rem$_{P\text{-}AR}$ of platform integrity of the access requester and another parameter Text7, and another parameter Text 4;

In the operation 4035, upon reception of the message 4, if the message 4 is constituted in the first form, then the TNC access point firstly verifies for validity the signature [N$_{AC\text{-}PM}$, Cert$_{AIK\text{-}AR}$, Re$_{AIK\text{-}AR}$, PCRs$_{AR}$, Parm$_{P\text{-}AR}$, Eval$_{P\text{-}AR}$, Parm$_{PP\text{-}AR}$, Re$_{P\text{-}AR}$, Rem$_{P\text{-}AR}$, N$_{AR}$, Cert$_{AIK\text{-}AC}$, Re$_{AIK\text{-}AC}$, PCRs$_{AC}$, Parm$_{P\text{-}AC}$, Eval$_{P\text{-}AC}$, Parm$_{PP\text{-}AC}$, Re$_{P\text{-}AC}$, Rem$_{P\text{-}AC}$, Text6]$_{Sig\text{-}PMU}$ performed with the private key corresponding to the user identity certificate Cert$_{User\text{-}PM}$ of the policy manager on the challenge N$_{AC\text{-}PM}$ of the access controller, the platform identity certificate Cert$_{AIK\text{-}AR}$ of the access requester, the verification result Re$_{AIK\text{-}AR}$ of the platform identity certificate of the access requester, the platform configuration register value PCRs$_{AR}$ of the access requester, the platform integrity measurement information Parm$_{P\text{-}AR}$ requested by the access controller from the access requester, the platform-level evaluation policy Eval$_{P\text{-}AR}$ of platform integrity of the access controller for the access requester, the actually received platform integrity measurement information Parm$_{PP\text{-}AR}$ of the access requester, the platform-level evaluation result Re$_{P\text{-}AR}$ of platform integrity of the access requester, the platform-level remediation information Rem$_{P\text{-}AR}$ of platform integrity of the access requester, the challenge N$_{AR}$ of the access requester, the platform identity certificate Cert$_{AIK\text{-}AC}$ of the access controller, the verification result Re$_{AIK\text{-}AC}$ of the platform identity certificate of the access controller, the platform configuration register value PCRs$_{AC}$ of the access controller, the platform integrity measurement information Parm$_{P\text{-}AC}$ requested by the access requester from the access controller, the platform-level evaluation policy Eval$_{P\text{-}AC}$ of platform integrity of the access requester for the access controller, the actually received platform integrity measurement information Parm$_{PP\text{-}AC}$ of the access controller, the platform-level evaluation result Re$_{P\text{-}AC}$ of platform integrity of the access controller, the platform-level remediation information Rem$_{P\text{-}AC}$ of platform integrity of the access controller and another parameter Text6, and if verification fails, then the TNC access point discards the message 4; otherwise, the TNC access point transmits the platform-level remediation information Rem$_{P\text{-}AC}$ of platform integrity of the access controller to the corresponding integrity measurement collector of the access controller and finally transmits to the TNC client a message 5 (constituted in a first form) including the challenge N$_{AC\text{-}PM}$ of the access controller, the platform configuration register value PCRs$_{AC}$ of the access controller, the signature [N$_{AR}$, PCRs$_{AC}$]$_{Sig\text{-}ACP}$ performed with the private key corresponding to the platform identity certificate Cert$_{AIK\text{-}AC}$ of the access controller on the challenge N$_{AR}$ of the access requester and the platform configuration register value PCRs$_{AC}$ of the access controller, the platform-level evaluation policy Eval$_{P\text{-}AR}$ of platform integrity of the access controller for the access requester, a platform authentication result Re$_{access}$ on the access requester, the message 4 and another parameter Text 5; and if the message 4 is constituted in the second form, then the TNC access point firstly verifies for validity the signature [N$_{AC\text{-}PM}$, Cert$_{AIK\text{-}AR}$, Re$_{AIK\text{-}AR}$, PCRs$_{AR}$, Parm$_{P\text{-}AR}$, Eval$_{P\text{-}AR}$, Parm$_{PP\text{-}AR}$, Re$_{P\text{-}AR}$, Rem$_{P\text{-}AC}$, another parameter Text6]$_{Sig\text{-}PMU}$ performed with the private key corresponding to the user identity certificate Cert$_{User\text{-}PM}$ of the policy manager on the challenge N$_{AC\text{-}PM}$ of the access controller, the platform identity certificate Cert$_{AIK\text{-}AR}$ of the access requester, the verification result Re$_{AIK\text{-}AR}$ of the platform identity certificate of the access requester, the platform configuration register value PCRs$_{AR}$ of the access requester, the platform integrity measurement information Parm$_{P\text{-}AR}$ requested by the access controller from the access requester, the platform-level evaluation policy Eval$_{P\text{-}AR}$ of platform integrity of the access controller for the access requester, the actually received platform integrity measurement information $Parm_{PP-AR}$ of the access requester, the platform-level evaluation result $Re_{P-AR}$ of platform integrity of the access requester, the platform-level remediation information $Rem_{P-AC}$ of platform integrity of the access controller and another parameter Text6, and if verification fails, then the TNC access point discards the message 4; otherwise, the TNC access point transmits the platform-level remediation information $Rem_{P-AC}$ of platform integrity of the access controller to the corresponding integrity measurement collector of the access controller and finally transmits to the TNC client a message 5 (constituted in a second form) including the challenge $N_{AC-PM}$ of the access controller, the platform configuration register value $PCRs_{AC}$ of the access controller, the signature $[N_{AR}, PCRs_{AC}]_{Sig-ACP}$ performed with the private key corresponding to the platform identity certificate $Cert_{AIK-AC}$ of the access controller on the challenge $N_{AR}$ of the access requester and the platform configuration register value $PCRs_{AC}$ of the access controller, the platform authentication result $Re_{access}$ on the access requester, the verification result $Re_{AIK-AC}$ of the platform identity certificate of the access controller, the platform-level evaluation result $Re_{P-AC}$ of platform integrity of the access controller, the platform-level remediation information $Rem_{P-AR}$ of platform integrity of the access requester, the actually received platform integrity measurement information $Parm_{PP-AC}$ of the access controller, the signature $[N_{AR}, Cert_{AIK-AC}, Re_{AIK-AC}, PCRs_{AC}, Parm_{P-AC}, Eval_{P-AC}, Parm_{PP-AC}, Re_{P-AC}, Rem_{P-AR}$, another parameter Text7$]_{Sig-PMU}$ performed with the private key corresponding to the user identity certificate $Cert_{User-PM}$ of the policy manager on the challenge $N_{AR}$ of the access requester, the platform identity certificate $Cert_{AIK-AC}$ of the access controller, the verification result $Re_{AIK-AC}$ of the platform identity certificate of the access controller, the platform configuration register value $PCRs_{AC}$ of the access controller, the platform integrity measurement information $Parm_{P-AC}$ requested by the access requester from the access controller, the platform-level evaluation policy $Eval_{P-AC}$ of platform integrity of the access requester for the access controller, the actually received platform integrity measurement information $Parm_{PP-AC}$ of the access controller, the platform-level evaluation result $Re_{P-AC}$ of platform integrity of the access controller, the platform-level remediation information $Rem_{P-AR}$ of platform integrity of the access requester and another parameter Text7, and another parameter Text5; and In the operation 4036, upon reception of the message 5, if the message 5 is constituted in the first form, then the TNC client firstly verifies for validity the signature $[N_{AR}, PCRs_{AC}]_{Sig-ACP}$ performed with the private key corresponding to the platform identity certificate $Cert_{AIK-AC}$ of the access controller on the challenge $N_{AR}$ of the access requester and the platform configuration register value $PCRs_{AC}$ of the access controller, and if verification fails, then the TNC client discards the message 5; otherwise, the TNC client verifies for validity the signature $[N_{AC-PM}, Cert_{AIK-AR}, Re_{AIK-AR}, PCRs_{AR}, Parm_{P-AR}, Eval_{P-AR}, Parm_{PP-AR}, Re_{P-AR}, Rem_{P-AR}, N_{AR}, Cert_{AIK-AC}, Re_{AIK-AC}, PCRs_{AC}, Parm_{P-AC}, Eval_{P-AC}, Parm_{PP-AC}, Re_{P-AC}, Rem_{P-AC}, Text6]_{Sig-PMU}$ performed with the private key corresponding to the user identity certificate $Cert_{User-PM}$ of the policy manager on the challenge $N_{AC-PM}$ of the access controller, the platform identity certificate $Cert_{AIK-AR}$ of the access requester, the verification result $Re_{AIK-AR}$ of the platform identity certificate of the access requester, the platform configuration register value $PCRs_{AR}$ of the access requester, the platform integrity measurement information $Parm_{P-AR}$ requested by the access controller from the access requester, the platform-level evaluation policy $Eval_{P-AR}$ of platform integrity of the access controller for the access requester, the actually received platform integrity measurement information $Parm_{PP-AR}$ of the access requester, the platform-level evaluation result $Re_{P-AR}$ of platform integrity of the access requester, the platform-level remediation information $Rem_{P-AR}$ of platform integrity of the access requester, the challenge $N_{AR}$ of the access requester, the platform identity certificate $Cert_{AIK-AC}$ of the access controller, the verification result $Re_{AIK-AC}$ of the platform identity certificate of the access controller, the platform configuration register value $PCRs_{AC}$ of the access controller, the platform integrity measurement information $Parm_{P-AC}$ requested by the access requester from the access controller, the platform-level evaluation policy $Eval_{P-AC}$ of platform integrity of the access requester for the access controller, the actually received platform integrity measurement information $Parm_{PP-AC}$ of the access controller, the platform-level evaluation result $Re_{P-AC}$ of platform integrity of the access controller, the platform-level remediation information $Rem_{P-AC}$ of platform integrity of the access controller and another parameter Text6, and if verification fails, then the TNC client discards the message 5; otherwise, the TNC client transmits the platform-level remediation information $Rem_{P-AR}$ of platform integrity of the access requester to the corresponding integrity measurement collector of the access requester; or if the message 5 is constituted in the second form, then the TNC client firstly verifies for validity the signature $[N_{AR}, PCRs_{AC}]_{Sig-ACP}$ performed with the private key corresponding to the platform identity certificate $Cert_{AIK-AC}$ of the access controller on the challenge $N_{AR}$ of the access requester and the platform configuration register value $PCRs_{AC}$ of the access controller, and if verification fails, then the TNC client discards the message 5; otherwise, the TNC client verifies for validity the signature $[N_{AR}, Cert_{AIK-AC}, Re_{AIK-AC}, PCRs_{AC}, Parm_{P-AC}, Eval_{P-AC}, Parm_{PP-AC}, Re_{P-AC}, Rem_{P-AR}$, another parameter Text7$]_{Sig-PMU}$ performed with the private key corresponding to the user identity certificate $Cert_{User-PM}$ of the policy manager on the challenge $N_{AR}$ of the access requester, the platform identity certificate $Cert_{AIK-AC}$ of the access controller, the verification result $Re_{AIK-AC}$ of the platform identity certificate of the access controller, the platform configuration register value $PCRs_{AC}$ of the access controller, the platform integrity measurement information $Parm_{P-AC}$ requested by the access requester from the access controller, the platform-level evaluation policy $Eval_{P-AC}$ of platform integrity of the access requester for the access controller, the actually received platform integrity measurement information $Parm_{PP-AC}$ of the access controller, the platform-level evaluation result $Re_{P-AC}$ of platform integrity of the access controller, the platform-level remediation information $Rem_{P-AR}$ of platform integrity of the access requester and another parameter Text7, and if verification fails, then the TNC client discards the message 5; otherwise, the TNC client transmits the platform-level remediation information $Rem_{P-AR}$ of platform integrity of the access requester to the corresponding integrity measurement collector of the access requester.

In the operation 404, if the actually received platform integrity measurement information $Parm_{PP-AR}$ of the access requester differs from the platform integrity measurement information $Parm_{P-AR}$ requested by the access controller from the access requester or the actually received platform integrity measurement information $Parm_{PP-AC}$ of the access controller differs from the platform integrity measurement information $Parm_{P-AC}$ requested by the access requester from the access controller, then the operation 403 shall be performed again until each of the access requester and the access controller has performed platform integrity evaluation on the opposite party according to the configured platform evaluation policy, and the TNC client generates a platform authentication result on the access controller from the platform evaluation policy for the access controller, the verification result $Re_{AIK-AC}$ of the platform identity certificate of the access controller and the platform-level evaluation result $Re_{P-AC}$ of platform integrity of the access controller and finally transmits the platform authentication result on the access controller to the network access requester; and the TNC access point generates a platform authentication result $Re_{access}$ on the access requester from the platform evaluation policy for the access requester, the verification result $Re_{AIK-AR}$ of the platform identity certificate of the access requester and the platform-level evaluation result $Re_{P-AR}$ of platform integrity of the access requester and finally transmits the platform authentication result $Re_{access}$ on the access requester to the network access controller.

In the operation 405, when the access requester or the access controller does not require user identity authentication, each of the network access requester and the network access controller makes an access decision according to the local security policy and the platform authentication result on the opposite party to perform access control; or when the access requester or the access controller requires user identity authentication, each of the network access requester and the network access controller makes an access decision according to the user identity authentication result of the opposite party, the platform authentication result on the opposite party and the local security policy to perform access control.

The operation 50 is to perform another platform authentication after platform repair. Particularly, the operation 50 includes the following operations 501-502.

In the operation 501, if the access requester or the access controller requires platform repair after the operation 40 is performed, then the respective integrity measurement collectors of the access requester perform platform repair according to the platform-level remediation information $Rem_{P-AR}$ of platform integrity of the access requester or the respective integrity measurement collectors of the access controller perform platform repair according to the platform-level remediation information $Rem_{P-AC}$ of platform integrity of the access controller.

In the operation 502, the respective integrity measurement collectors of the access requester trigger the TNC client to perform another platform authentication upon completion of platform repair or the respective integrity measurement collectors of the access controller trigger the TNC access point to perform another platform authentication upon completion of platform repair, and the TNC client or TNC access point branches to the operation 20, the operation 30 or the operation 40 dependent upon an influence of platform repair upon network connectivity between the access requester and the access controller and the local security policy.

The operation 60 is to perform another platform authentication activated after platform authentication; and if the respective integrity measurement collectors of the access requester or the TNC client and the respective integrity measurement collectors of the access controller or the TNC access point are activated according to the local security policy to perform another platform authentication, then the flow branches to the operation 30 or the operation 40 according to the local security policy.

Those ordinarily skilled in the art may appreciate that all or a part of the operations in the above method embodiments can be performed by a program instructing relevant hardware, where the program may be stored in a computer readable storage medium and upon execution may perform the operations in the above method embodiments, and the storage medium may include various mediums capable of storing program codes e.g., an ROM, an RAM, a magnetic disk, an optical disk, etc.

Lastly, it shall be noted that the foregoing embodiments are intended to merely illustrate but not limit the technical solution of the invention, and although the invention has been detailed in connection with the foregoing embodiments, those ordinarily skilled in the art shall appreciate that the technical solution recited in the respective embodiments can be modified or a part of technical features therein can be substituted equivalently without departing from the scope of the technical solution in the respective embodiments of the invention.

The invention claimed is:

1. A trusted network connection method based upon tri-element peer authentication, comprising:
    an operation 1 of performing configuration and initialization;
    an operation 2 of requesting a network connection: an access requester transmitting a network connection request to an access controller, and the access controller receiving the network connection request;
    an operation 3 of performing user identity authentication; and
    an operation 4 of performing platform authentication;
    wherein the operation 1 comprises:
        an operation 11 of a network user configuring the access requester with a security policy for the access controller, comprising a platform evaluation policy of the access requester for the access controller; and a network administrator configuring the access controller with a security policy for the access requester, comprising a platform evaluation policy of the access controller for the access requester; and
        an operation 12 of the access requester and the access controller loading and initializing respective integrity measurement collectors, and a policy manager loading and initializing an integrity measurement verifier;
    the operation 3 comprises:
        an operation 31 of branching to an operation 33 if the access requester or the access controller does not require user identity authentication;
        an operation 32 of, if the access requester or the access controller requires user identity authentication, then when the access requester and the access controller have not performed user identity authentication, the access requester and the access controller executing a tri-element peer authentication protocol with the policy manager being a trusted party to perform user identity authentication and key negotiation between the access requester and the access controller and performing the operation 33; or when the access requester and the access controller have performed user identity authentication, the access requester and the access controller (a) performing user identity authentication and key negotiation between the access requester and the access controller based upon performed user identity authentication and performing the operation 33 or (b) executing the tri-element peer authentication protocol again based upon the policy manager being a trusted party to perform user identity authentication and key negotiation between the access requester and the access controller and performing the operation 33; and
        the operation 33 of, if the access requester or the access controller requires prompt making of an access decision, then when the access requester or the access controller does not require user identity authentication, each of the access requester and the access controller making an access decision according to a local security policy to perform access control; or when the access requester or the access controller requires user identity authentication, each of the access requester and the access controller making an access decision according to a user identity authentication result made for each other and the local security policy to perform access control; otherwise, the access requester or the access controller requesting platform authentication;

the operation 4 comprises:

an operation 41 of the access requester or the access controller requesting online a platform identity certificate from the policy manager if the access requester or the access controller requires online requesting of the platform identity certificate from the policy manager;

an operation 42 of, if the network administrator has not configured the access controller with the platform evaluation policy of the access controller for the access requester, then the access controller requesting the platform evaluation policy of the access controller for the access requester from the policy manager, and then the policy manager transmitting the platform evaluation policy of the access controller for the access requester to the access controller, and the access controller performing configuration upon reception of the platform evaluation policy of the access controller for the access requester;

an operation 43 of the access requester and the access controller executing the tri-element peer authentication protocol with the policy manager being a trusted party to perform platform authentication, comprising platform identity verification and platform integrity evaluation, between the access requester and the access controller, wherein the policy manager is responsible for platform identity certificate verification and integrity measurement verifier-level evaluation of platform integrity for the access requester and the access controller;

an operation 44 of performing the operation 43 for a plurality of rounds until each of the access requester and the access controller has performed platform integrity evaluation on each other according to the respective configured platform evaluation policy of the access requester or access controller for each other, and the access requester generating a platform-level evaluation result of platform integrity of the access controller from the platform evaluation policy of the access requester for the access controller and an integrity measurement verifier-level evaluation result of platform integrity of the access controller, then the access requester generating a platform authentication result of the access controller from the platform evaluation policy of the access requester for the access controller, a verification result of the platform identity certificate of the access controller and the platform-level evaluation result of platform integrity of the access controller; and the access controller generating a platform-level evaluation result of platform integrity of the access requester from the platform evaluation policy of the access controller for the access requester and an integrity measurement verifier-level evaluation result of platform integrity of the access requester, then the access controller generating a platform authentication result on the access requester from the platform evaluation policy of the access controller for the access requester, a verification result of the platform identity certificate of the access requester and the platform-level evaluation result of platform integrity of the access requester; and an operation 45 of, when the access requester or the access controller does not require user identity authentication, to perform access control, the access requester making an access decision according to the security policy of the access requester and the platform authentication result of the access controller and the access controller making an access decision according to the security policy of the access controller and the platform authentication result of the access requester; or when the access requester or the access controller requires user identity authentication, to perform access control, the access requester making an access decision according to a user identity authentication result of the access controller, the platform authentication result of the access controller and the security policy for the access controller and the access controller making an access decision according to a user identity authentication result of the access requester, the platform authentication result of the access requester and the security policy for the access requester.

2. The trusted network connection method based upon tri-element peer authentication according to claim 1, comprising, after the operation 4,
    an operation 5 of performing another platform authentication after platform repair.

3. The trusted network connection method based upon tri-element peer authentication according to claim 2, wherein the operation 5 comprises:
    an operation 51 of the access requester or the access controller performing platform repair if the access requester or the access controller requires platform repair after the operation 4 is performed; and
    an operation 52 of branching to the operation 2, the operation 3 or the operation 4 dependent upon a local security policy and an influence of platform repair upon network connectivity between the access requester and the access controller after the access requester or the access controller performs platform repair.

4. The trusted network connection method based upon tri-element peer authentication according to claim 3, wherein after the operation 5, the method further comprises:
    an operation 6 of performing another platform authentication activated after platform authentication; and branching to the operation 3 or the operation 4 according to the security policy of the access requester or access controller if the respective access requester or access controller is activated according to the respective security policy of the access requester or access controller to perform another platform authentication.

5. A trusted network connection method based upon tri-element peer authentication, comprising:
    an operation 1 of performing configuration and initialization;
    an operation 2 of requesting a network connection: an access requester transmitting a network connection request to an access controller, and the access controller receiving the network connection request;
    an operation 3 of performing user identity authentication; and
    an operation 4 of performing platform authentication;
    wherein the operation 1 comprises:
    an operation 11 of a network user configuring the access requester with a security policy for the access controller, comprising a platform evaluation policy of the access requester for the access controller; and a network administrator configuring the access controller with a security policy for the access requester, comprising a platform evaluation policy of the access controller for the access requester; and an operation 12 of the access requester and the access controller loading and initializing respective integrity measurement collectors, and a policy manager loading and initializing an integrity measurement verifier;

the operation 3 comprises:

an operation 31 of branching to an operation 33 if the access requester or the access controller does not require user identity authentication;

an operation 32 of, if the access requester or the access controller requires user identity authentication, then when the access requester and the access controller have not performed user identity authentication, the access requester and the access controller executing a tri-element peer authentication protocol with the policy manager being a trusted party to perform user identity authentication and key negotiation between the access requester and the access controller and performing the operation 33; or when the access requester and the access controller have performed user identity authentication, the access requester and the access controller (a) performing user identity authentication and key negotiation between the access requester and the access controller based upon performed user identity authentication and performing the operation 33 or (b) executing the tri-element peer authentication protocol again based upon the policy manager being a trusted party to perform user identity authentication and key negotiation between the access requester and the access controller and performing the operation 33; and the operation 33 of, if the access requester or the access controller requires prompt making of an access decision, then when the access requester or the access controller does not require user identity authentication, each of the access requester and the access controller making an access decision according to a local security policy to perform access control; or when the access requester or the access controller requires user identity authentication, each of the access requester and the access controller making an access decision according to a user identity authentication result made for each other and the local security policy to perform access control; otherwise, the access requester or the access controller requesting platform authentication;

the operation 4 comprises:

an operation 401 of the access requester or the access controller requesting online a platform identity certificate from the policy manager if the access requester or the access controller requires online requesting of the platform identity certificate from the policy manager;

an operation 402 of, if the network administrator has not configured the access controller with the platform evaluation policy of the access controller for the access requester, then the access controller requesting the platform evaluation policy of the access controller for the access requester from the policy manager, and then the policy manager transmitting the platform evaluation policy of the access controller for the access requester to the access controller, and the access controller performing configuration upon reception of the platform evaluation policy of the access controller for the access requester;

an operation 403 of the access requester and the access controller executing the tri-element peer authentication protocol with the policy manager being a trusted party to perform platform authentication, comprising platform identity verification and platform integrity evaluation, between the access requester and the access controller, wherein the policy manager is responsible for platform identity certificate verification and platform-level evaluation of platform integrity for the access requester and the access controller;

an operation of 404 of performing the operation 403 for a plurality of rounds until each of the access requester and the access controller has performed platform integrity evaluation on each other according to the respective configured platform evaluation policy of the access requester or access controller for each other, and the policy manager generating, and then transmitting to the access requester and the access controller, platform-level evaluation results of platform integrity of the access requester and the access controller; and the access requester generating a platform authentication result of the access controller from the platform evaluation policy of the access requester for the access controller, a verification result of the platform identity certificate of the access controller and the platform-level evaluation result of platform integrity of the access controller; and the access controller generating a platform authentication result of the access requester from the platform evaluation policy of the access controller for the access requester, a verification result of the platform identity certificate of the access requester and the platform-level evaluation result of platform integrity of the access requester; and an operation 405 of, when the access requester or the access controller does not require user identity authentication, to perform access control, the access requester making an access decision according to the security policy of the access requester and the platform authentication result of the access controller and the access controller making an access decision according to the security policy of the access controller and the platform authentication result of the access requester; or when the access requester or the access controller requires user identity authentication, to perform access control, the access requester making an access decision according to a user identity authentication result of the access controller, the platform authentication result of the access controller and the security policy for the access controller and the access controller making an access decision according to a user identity authentication result of the access requester, the platform authentication result of the access requester and the security policy for the access requester.

6. The trusted network connection method based upon tri-element peer authentication according to claim 5, comprising, after the operation 4, an operation 5 of performing another platform authentication after platform repair.

7. The trusted network connection method based upon tri-element peer authentication according to claim 6, wherein the operation 5 comprises:

an operation 51 of the access requester or the access controller performing platform repair if the access requester or the access controller requires platform repair after the operation 4 is performed; and an operation 52 of branching to the operation 2, the operation 3 or the operation 4 dependent upon a local security policy and an influence of platform repair upon network connectivity between the access requester and the access controller after the access requester or the access controller performs platform repair.

8. The trusted network connection method based upon tri-element peer authentication according to claim 7, wherein after the operation 5, the method further comprises:
an operation 6 of performing another platform authentication activated after platform authentication; and branching to the operation 3 or the operation 4 according to the security policy of the access requester or access controller if the respective access requester or access controller is activated according to the respective security policy of the access requester or access controller to perform another platform authentication.

* * * * *